United States Patent
Sarma et al.

(10) Patent No.: US 8,972,231 B2
(45) Date of Patent: Mar. 3, 2015

(54) SYSTEM AND METHOD FOR PREDICTING FLUID FLOW IN SUBTERRANEAN RESERVOIRS

(75) Inventors: Pallav Sarma, San Ramon, CA (US); Wen Hsiung Chen, Danville, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 1009 days.

(21) Appl. No.: 12/657,929

(22) Filed: Jan. 29, 2010

(65) Prior Publication Data

US 2010/0198570 A1  Aug. 5, 2010

Related U.S. Application Data

(60) Provisional application No. 61/148,800, filed on Jan. 30, 2009.

(51) Int. Cl.
- G06G 7/48 (2006.01)
- G06G 7/50 (2006.01)
- G06F 17/50 (2006.01)

(52) U.S. Cl.
CPC ........ *G06F 17/5022* (2013.01); *G06F 2217/16* (2013.01)
USPC ................................ 703/9; 703/10

(58) Field of Classification Search
CPC ..... G01V 11/00; G01V 99/00; G01V 99/005; G06F 17/5018; G06F 17/5009; G06F 17/5022; G06F 2217/16
USPC .......................................... 703/9, 10
See application file for complete search history.

(56) References Cited

U.S. PATENT DOCUMENTS

| | | | |
|---|---|---|---|
| 4,969,130 | A | 11/1990 | Wason et al. |
| 5,992,519 | A | 11/1999 | Ramakrishnan et al. |
| 7,584,081 | B2 | 9/2009 | Wen et al. |

(Continued)

FOREIGN PATENT DOCUMENTS

| | | |
|---|---|---|
| EP | 1975879 A2 | 10/2008 |
| JP | 02-286899 A | 11/1990 |
| KR | 10-2005-0037342 A | 4/2005 |

OTHER PUBLICATIONS

Sarma et al. (Efficient closed-loop optimal control of petroleum reservoir under uncertainties, 2006, (221 pages)).*

(Continued)

*Primary Examiner* — Kamini S Shah
*Assistant Examiner* — Andre Pierre Louis

(57) ABSTRACT

A reservoir prediction system is disclosed that uses a kernel-based ensemble Kalman filter (EnKF) capable of representing non-Gaussian random fields characterized by multi-point geostatistics. The EnKF uses only the covariance and cross-covariance between the random fields (to be updated) and observations, thereby only preserving two-point statistics. The kernel-based EnKF allows the creation of nonlinear generalizations of linear algorithms that can be exclusively written in terms of dot products. By deriving the EnKF in a high-dimensional feature space implicitly defined using kernels, both the Kalman gain and update equations are nonlinearized, thus providing a completely general nonlinear set of EnKF equations, the nonlinearity being controlled by the kernel. By choosing high order polynomial kernels, multi-point statistics and therefore geological realism of the updated random fields can be preserved.

20 Claims, 24 Drawing Sheets

(56) References Cited

U.S. PATENT DOCUMENTS

| | | | |
|---|---|---|---|
| 8,032,345 B2 | 10/2011 | Le Ravalec et al. | |
| 2002/0016703 A1 | 2/2002 | Barroux | |
| 2007/0118346 A1 | 5/2007 | Wen et al. | |
| 2007/0255500 A1* | 11/2007 | Pita et al. | 702/11 |
| 2007/0271077 A1 | 11/2007 | Kosmala et al. | |
| 2008/0065363 A1 | 3/2008 | Middya | |
| 2009/0070086 A1 | 3/2009 | Le Ravalec et al. | |
| 2009/0157590 A1* | 6/2009 | Mijares et al. | 706/61 |
| 2010/0198570 A1 | 8/2010 | Sarma et al. | |
| 2011/0218737 A1 | 9/2011 | Gulati | |
| 2012/0215511 A1 | 8/2012 | Sarma et al. | |
| 2013/0338983 A1 | 12/2013 | Sarma et al. | |

OTHER PUBLICATIONS

Vabo et al. (Using the EnKF with Kernel method for estimating of non-Gaussian variables, 2008 (9 pages).*

Aziz et al. (Petroleum Reservoir Simulation, 1979 (250 pages).*

Bernhard et al. (Nonlinear Component Analysis as a Kernel eigenvalue problem, 1998 (21 pages)).*

Aziz, K., Settari, A., Petroleum Reservoir Simulation, Chapman and Hall, 1979.

Gu, Y., Oliver, D.S., History Matching of the PUNQ-S3 Reservoir Model Using the Ensemble Kalman Filter, SPE Journal, 10, 217-224, 2005.

Kwok, J.T., Tsang, I.W., The Pre-Image Problem with Kernel Methods, IEEE Transactions in Neural Networks, 15, 1517-1525, 2004.

Li, G., Reynolds, A.C., An Iterative Ensemble Kalman Filter for Data Assimilation, paper SPE 109808 presented at the SPE Annual Technical Conference and Exhibition, Anaheim, CA, 2007.

Naevdal, G., Johnsen, L.M., Aanonsen, S.I., Vefring, E.H., Reservoir Monitoring and Continuous Model Updating Using Ensemble Kalman Filter, SPE paper 84372 presented at the SPE Annual Technical Conference and Exhibition, Denver, CO, 2003.

Naevdal, G., Mannseth, T., Vefring, E.H., Near-Well Reservoir Monitoring Through Ensemble Kalman Filter, paper SPE 75235 presented at the SPE/DOE Improved Oil Recovery Symposium, Tulsa, OK, 2002.

Sarma, P., Durlofsky, L., Aziz, K., A New Approach to Automatic History Matching using Kernel PCA, paper SPE 106176 presented at the SPE Reservoir Simulation Symposium, Houston, TX, 2006.

Sarma, P., Durlofsky, L.J., Aziz, K., Kernel Principal Component Analysis for an Efficient, Differentiable Parameterization of Multipoint Geostatistics, Mathematical Geosciences, 40, 3-32, 2008.

Scholkopf, B., Smola, A., Muller, K., Nonlinear Component Analysis as a Kernel Eigenvalue Problem, Neural Computation, 10, 1299-1319, 1998.

Scholkopf, B., Smola, A.J., Learning with Kernels, MIT Press, Cambridge, MA, 2002.

Skjervheim, J.A., Evensen, G., Aanonsen, S.I., Ruud, B.O., Johansen, T.A., Incorporating 4D Seismic Data in Reservoir Simulation Models Using Ensemble Kalman Filter, SPE Journal, 12, 282-292, 2007.

Strebelle, S., Conditional Simulation of Complex Geological Structures using Multiple-point Statistics, Mathematical Geology, 34, 1-22, 2002.

Wen, X.-H., Chen, W.H., Real-time Reservoir Model Updating Using Ensemble Kalman Filter, paper SPE 92991 presented at the SPE Reservoir Simulation Symposium, Houston, TX, 2005.

Zhang, T., Multiple Point Geostatistics: Filter-based Local Training Pattern Classification for Spatial Pattern Simulation, PhD Thesis, Stanford University, Stanford, CA, 2006.

Aanonsen, Sigurd I., et al; "The Ensemble Kalman Filter in Reservoir Engineering-a Review"; SPE Journal, Sep. 2009, pp. 393-412.

Evensen, Geir; "Sequential Data Assimilation with a Nonlinear Quasi-Geostrophic Model Using Monte Carlo Methods to Forecast Error Statistics"; May 15, 1994, Journal of Geophysical Research, vol. 99, No. C5, pp. 10,143-10,162.

Evensen, Geir; "The Ensemble Kalman Filter: Theoretical Formulation and Practical Implementation"; Ocean Dynamics, 2003, vol. 53, pp. 343-367.

Fahimuddin, Abul, et al.; "4D Seismic History Matching of a Real Field Case with EnKF: Use of Local Analysis for Modeling Updating"; SPE 134894, 2010 SPE Annual Technical Conference and Exhibition in Florence, Tuscany, Italy, Sep. 20-22, 2010, SPE 134894, pp. 1-16.

Fahimuddin, Abul; "4D Seismic History Matching Using the Ensemble Kalman Filter (EnKF): Possibilities and Challenges"; Thesis, Mar. 2010, Title Page, Summary, Preface, Acknowledgements, and Table of Contents, Part 1.

Fahimuddin, Abul; "4D Seismic History Matching Using the Ensemble Kalman Filter (EnKF): Possibilities and Challenges"; Thesis, Mar. 2010, Chapters 1 and 2, Part 2.

Fahimuddin, Abul; "4D Seismic History Matching Using the Ensemble Kalman Filter (EnKF): Possibilities and Challenges"; Thesis, Mar. 2010, Chapters 3-4, Part 3.

Fahimuddin, Abul; "4D Seismic History Matching Using the Ensemble Kalman Filter (EnKF): Possibilities and Challenges"; Thesis, Mar. 2010, Chapters 5-6, Part 4.

Fahimuddin, Abul; "4D Seismic History Matching Using the Ensemble Kalman Filter (EnKF): Possibilities and Challenges"; Thesis, Mar. 2010, Chapters 7-8, and Bibliography, Part 5.

Ott, Edward, et al.; "A Local Ensemble Kalman Filter for Atmospheric Data Assimilation"; Tellus, 2004, vol. 56A, pp. 415-428.

Li, Xin; "Continuous Reservoir Model Updating by Ensemble Kalman Filter on Grid Computing Architectures"; a Dissertation, Dec. 2008, Title Page, Acknowledgments, Table of Contents, List of Tables, List of Figures, Abstract, and Chapter 1, Part 1.

Li, Xin; "Continuous Reservoir Model Updating by Ensemble Kalman Filter on Grid Computing Architectures"; a Dissertation, Dec. 2008, Chapters 2-3, Part 2.

Li, Xin; "Continuous Reservoir Model Updating by Ensemble Kalman Filter on Grid Computing Architectures"; a Dissertation, Dec. 2008, Chapters 4-5, Part 3.

Li, Xin; "Continuous Reservoir Model Updating by Ensemble Kalman Filter on Grid Computing Architectures"; a Dissertation, Dec. 2008, Chapters 6-8 (Sections 8.1 through 8.3 p. 130)), Part 4.

International Search Report, issued on Sep. 19, 2012 during the prosecution of International Application No. PCT/US2012/025357.

Written Opinion of the International Searching Authority, issued on Sep. 19, 2012 during the prosecution of International Application No. PCT/US2012/025357.

International Search Report, issued on Jun. 25, 2014 during the prosecution of International Application No. PCT/US2013/045386.

Written Opinion of the International Searching Authority, issued on Jun. 25, 2014 during the prosecution of International Application No. PCT/US2013/045386.

Li, Xin; "Continuous Reservoir Model Updating by Ensemble Kalman Filter on Grid Computing Architectures"; a Dissertation, Dec. 2008, continuation of Chapter 8 (Section 8.3 through Section 8.5), Chapter 9, Bibliography, Appendices A-D, Part 5.

Ralaivola, Liva, et al.; "Time Series Filtering, Smoothing and Learning using the Kernel Kalman Filter"; Proceedings of International Joint Conference on Neural Networks, Montreal, Canada, Jul. 31 through Aug. 4, 2005, pp. 1449-1454.

Srinivasan, Balaji Vasan; "Gaussian Process Regression for Model Estimation"; Thesis, 2008, University of Maryland.

Non-Final Office Action mailed Dec. 28, 2012, during the prosecution of Co-Pending U.S. Appl. No. 13/029,534, filed Feb. 17, 2011.

Final Office Action mailed Sep. 6, 2013, during the prosecution of Co-Pending U.S. Appl. No. 13/029,534, filed Feb. 17, 2011.

Non-Final Office Action mailed Jun. 4, 2014, during the prosecution of Co-Pending U.S. Appl. No. 13/029,534, filed Feb. 17, 2011.

Non-Final Office Action mailed Jun. 5, 2014, during the prosecution of Co-Pending U.S. Appl. No. 13/843,096, filed Mar. 15, 2013.

* cited by examiner

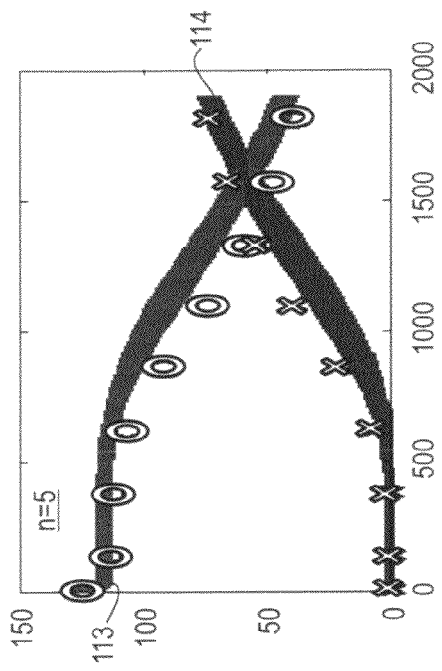
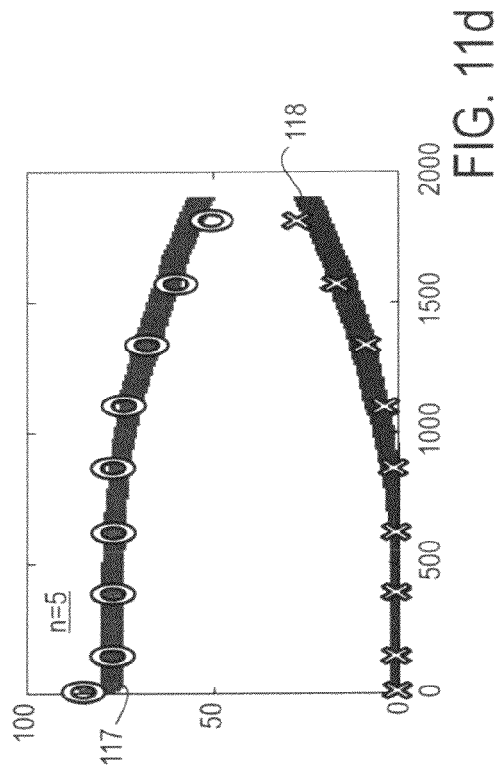
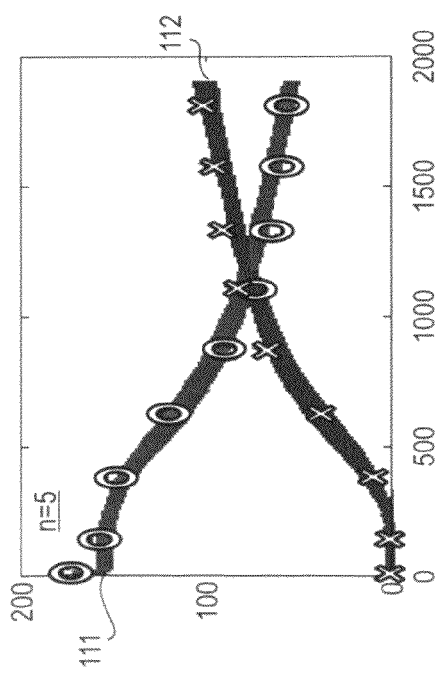
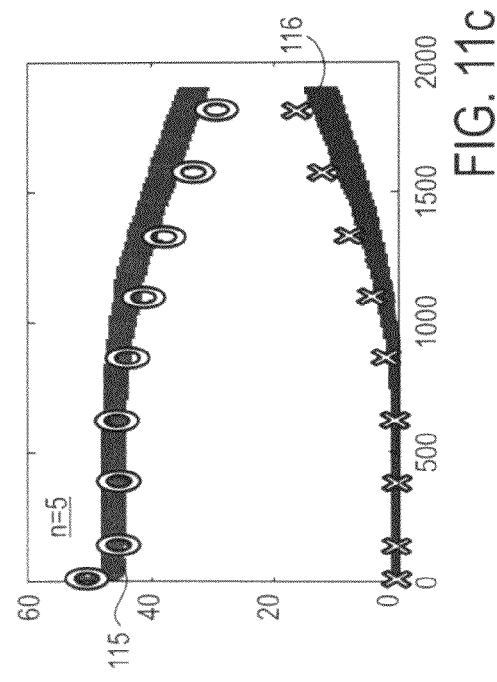

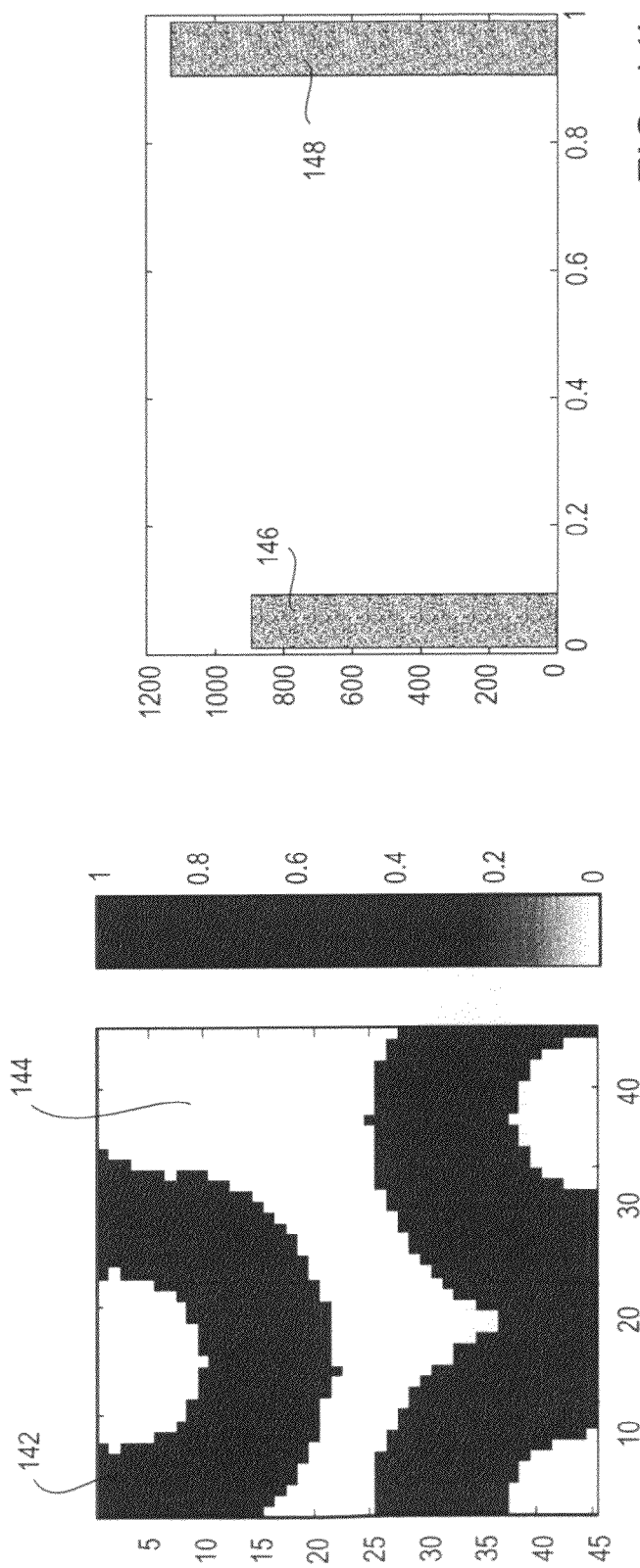

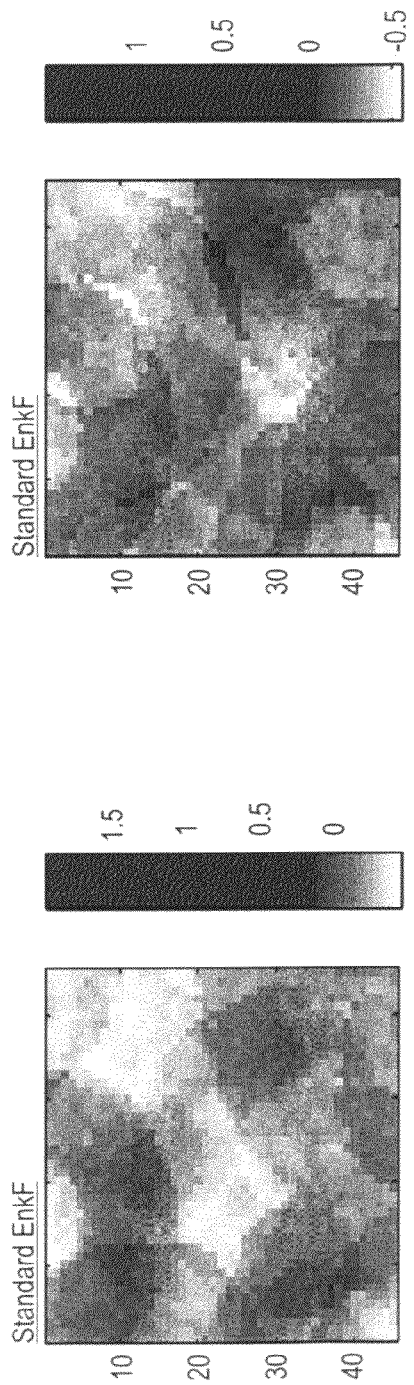
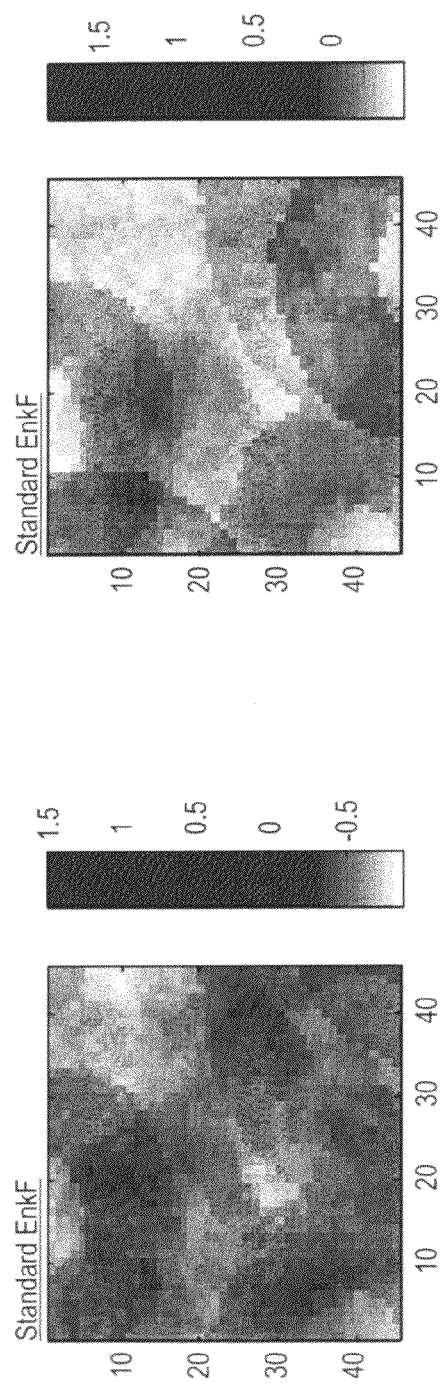
FIG. 17a
FIG. 17b
FIG. 17c
FIG. 17d

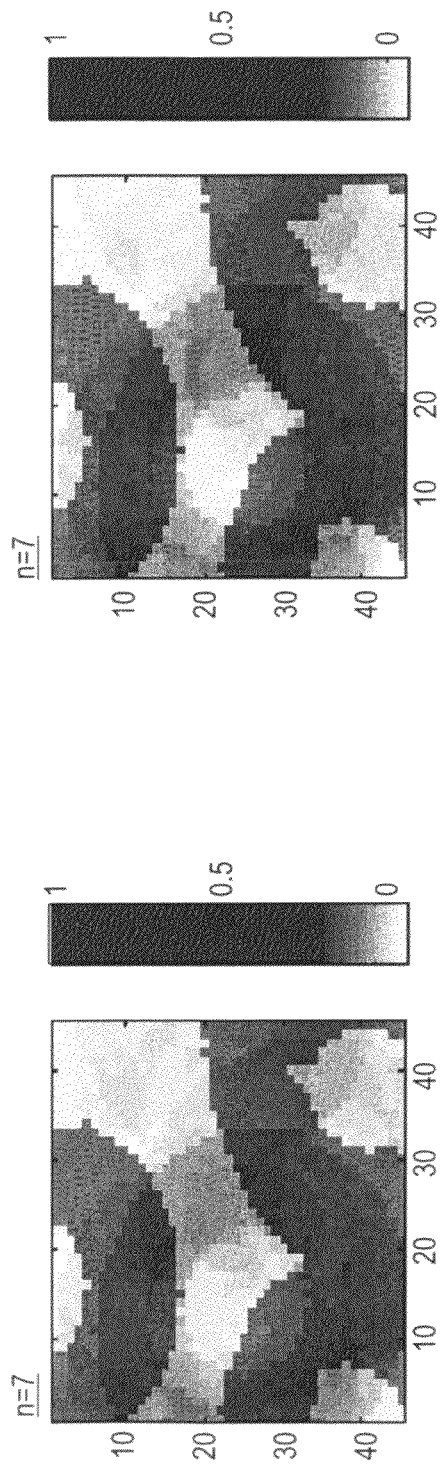
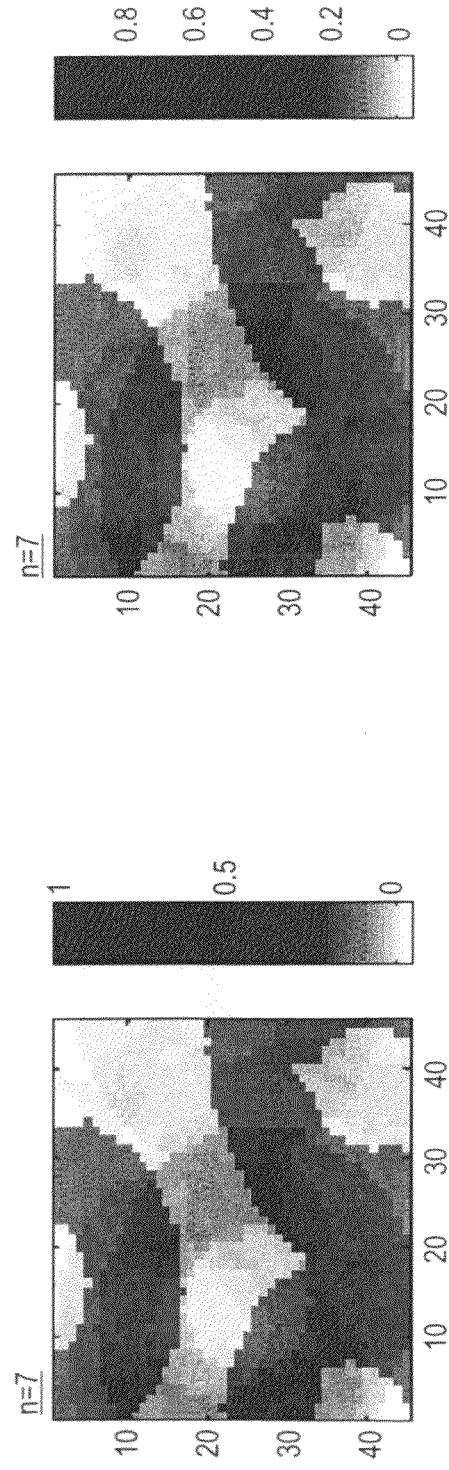
FIG. 19a  FIG. 19b  FIG. 19c  FIG. 19d

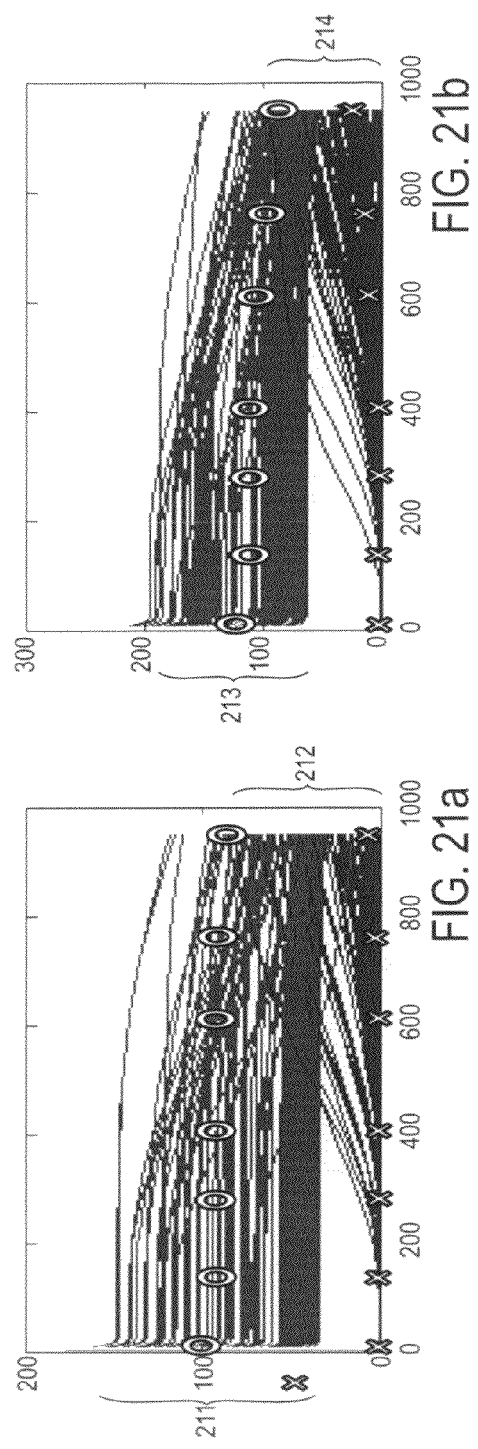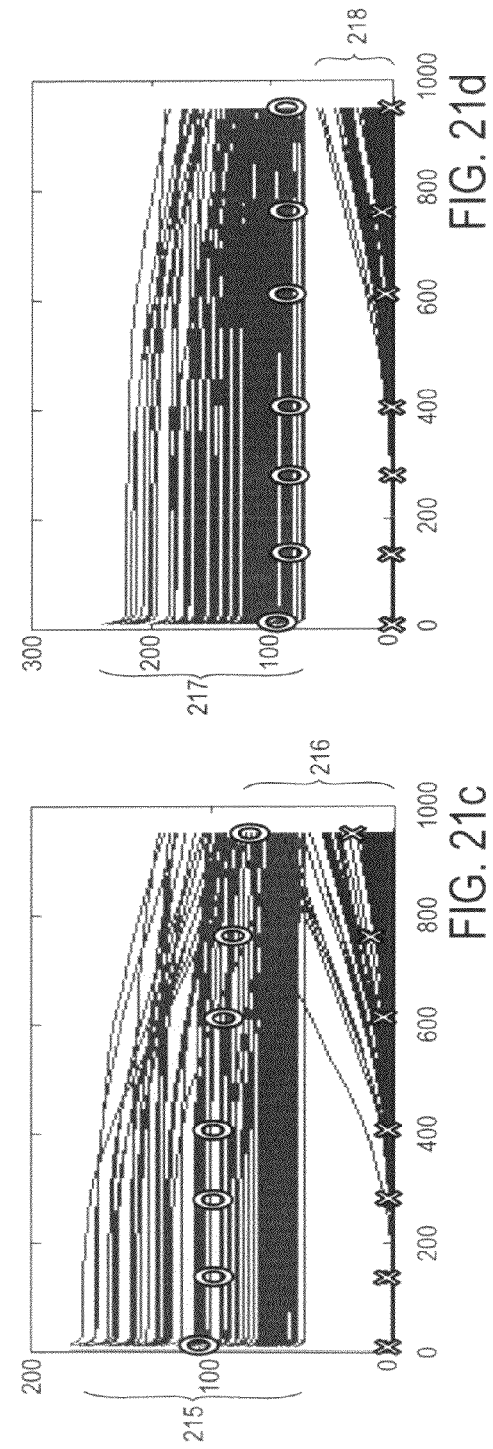

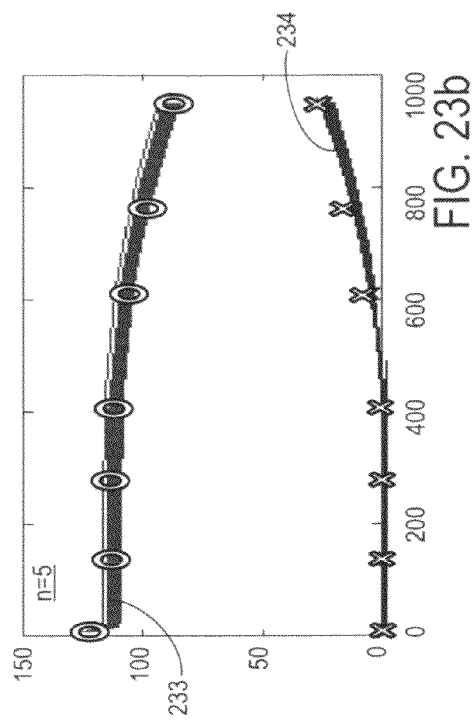
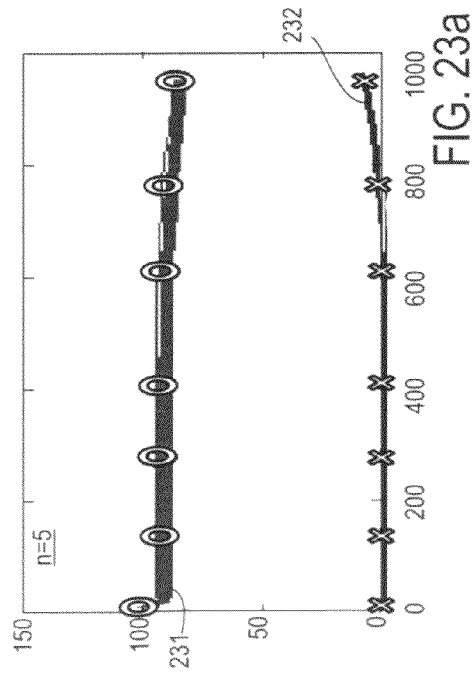
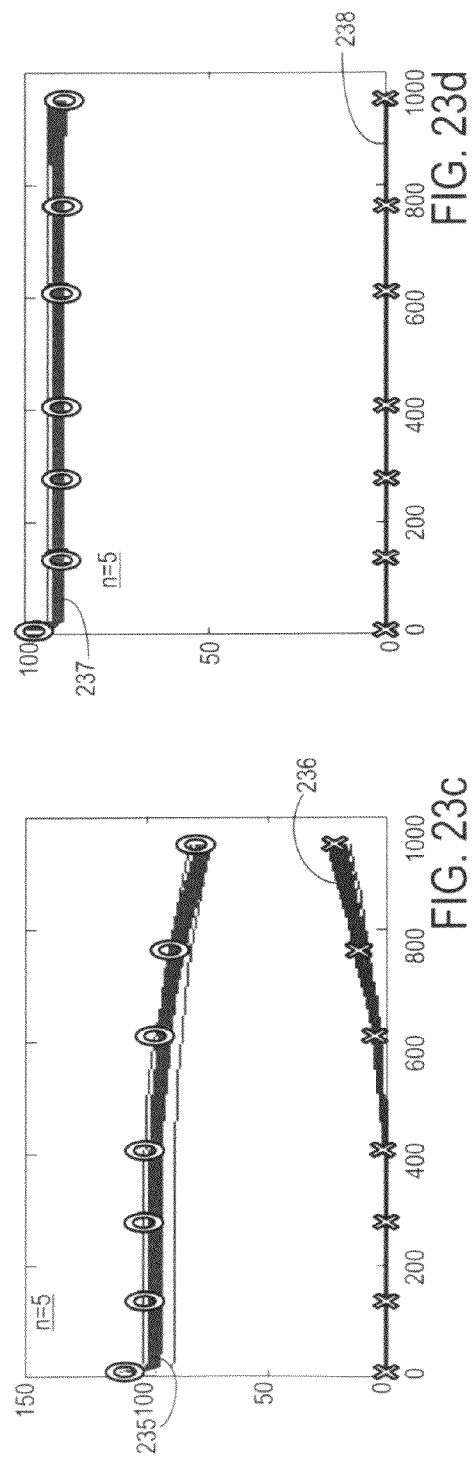
FIG. 23a
FIG. 23b
FIG. 23c
FIG. 23d

SYSTEM AND METHOD FOR PREDICTING FLUID FLOW IN SUBTERRANEAN RESERVOIRS

This application claims priority to U.S. Ser. No. 61/148,800, filed Jan. 30, 2009, which is incorporated herein by reference in its entirety.

FIELD OF THE INVENTION

The present invention relates generally to a system and method for predicting fluid flow within subterranean reservoirs, and more particularly, to a system and method for utilizing kernel-based ensemble Kalman filters for updating reservoir models corresponding to reservoirs having non-Gaussian random field and non-Gaussian production data characteristics.

BACKGROUND OF THE INVENTION

Integrating various kinds of static and dynamic data during the reservoir modeling and simulation process has been shown to reduce the uncertainty of the simulation models, thereby improving the predictive capacity of such models, which in turn can lead to better reservoir management decisions. In this regard, the ensemble Kalman filter (EnKF) has recently generated significant attention as a promising method for conditioning reservoir simulation models to dynamic production data. Further, a recent emphasis on uncertainty quantification, closed-loop reservoir optimization and real-time monitoring has made the EnKF even more valuable, as the EnKF is particularly suited for continuous model updating, and provides an ensemble of models that can be used to approximate the posterior distribution of any output of the simulation model.

The EnKF has been recently applied and improved upon by many researchers in the petroleum industry. It was introduced to the petroleum industry by Naevdal, G., Johnsen, L. M., Aanonsen, S. I., Vefring, E. H., Reservoir Monitoring and Continuous Model Updating Using Ensemble Kalman Filter, SPE paper 84372 presented at the SPE Annual Technical Conference and Exhibition, Denver, Colo., 2003. Naevdal, G., Mannseth, T., Vefring, E. H., Near-Well Reservoir Monitoring Through Ensemble Kalman Filter, paper SPE 75235 presented at the SPE/DOE Improved Oil Recovery Symposium, Tulsa, Okla., 2002, wherein the EnKF was used to update static parameters in near-wellbore simulation models, and later also used to update permeability, pressure and saturation fields of a 2D three phase simulation model. Since then, others have modified and improved the EnKF including, Gu, Y., Oliver, D. S., History Matching of the PUNQ-S3 Reservoir Model Using the Ensemble Kalman Filter, *SPE Journal*, 10, 217-224, 2005, Wen, X.-H., Chen, W. H., Real-time Reservoir Model Updating Using Ensemble Kalman Filter, paper SPE 92991 presented at the SPE Reservoir Simulation Symposium, Houston, Tex., 2005, Li, G., Reynolds, A. C., An Iterative Ensemble Kalman Filter for Data Assimilation, paper SPE 109808 presented at the SPE Annual Technical Conference and Exhibition, Anaheim, Calif., 2007, Skjervheim, J. A., Evensen, G., Aanonsen, S. I., Ruud, B. O., Johansen, T. A., Incorporating 4D Seismic Data in Reservoir Simulation Models Using Ensemble Kalman Filter, *SPE Journal*, 12, 282-292, 2007, etc.

It is known that a key limitation of the EnKF is that it is technically appropriate only for random fields (e.g., permeability) characterized by two-point geostatistics (multi-Gaussian random fields). Application of the EnKF to complex non-Gaussian geological models such as channels systems leads to modification of these models towards Gaussianity. As a result, although a good agreement to the observed production data may be obtained from the updated models, the predictive capacity of such models may be questionable. The main reason behind this limitation is that the updated ensemble obtained using the EnKF is a linear combination of the forecasted ensemble, and the EnKF only uses the covariance and cross-covariance between the random fields (to be updated) and observations, thereby only preserving two-point statistics.

Kernel methods have recently generated significant interest in the machine learning community (Scholkopf, B., Smola, A. J., *Learning with Kernels*, MIT Press, Cambridge, Mass., 2002), and enable efficient nonlinear generalizations of linear algorithms. Well known examples of the application of kernel methods to linear algorithms to create nonlinear generalizations are support vector machines, kernel-based clustering, and kernel principal component analysis (Scholkopf, B., Smola, A. J., *Learning with Kernels*, MIT Press, Cambridge, Mass., 2002). See also Sarma, P., Durlofsky, L. J., Aziz, K., Kernel Principal Component Analysis for an Efficient, Differentiable Parameterization of Multipoint Geostatistics, *Mathematical Geosciences*, 40, 3-32, 2008, which describes a method that utilizes kernel PCA to parameterize non-Gaussian random fields, which could then be used with gradient-based optimization methods for efficient history matching while preserving geological realism.

SUMMARY OF THE INVENTION

A system is provided for predicting fluid flow in a subterranean reservoir having non-Gaussian characteristics. The system includes a computer processor, a computer readable program code for accessing a set of models representing the reservoir, and one or more data sources in communication with and/or accessible to the computer processor for collecting reservoir field data for a predetermined duration of time. The system further includes a reservoir model update program code, executable by the computer processor, for receiving the reservoir field data and for using the field data to update the set of models at a predetermined time such that data from the updated set of models is consistent with the field data.

In accordance with the present invention, the non-Gaussian characteristics of the reservoir in the updated set of models are preserved, thereby maximizing accuracy of reservoir prediction data to be generated by the updated set of models.

In accordance with another aspect of the present invention kernel methods are used to create a nonlinear generalization of the EnKF capable of representing non-Gaussian random fields characterized by multi-point geostatistics. By deriving the EnKF in a high-dimensional feature space implicitly defined using kernels, both the Kalman gain and update equations are nonlinearized, thus providing a completely general nonlinear set of EnKF equations, the nonlinearity being controlled by the kernel. The feature space and associated kernel are chosen such that it is more appropriate to apply the EnKF in this space rather than in the input space. In accordance with non-limiting embodiment, such class of kernels is high order polynomial kernels, using which multi-point statistics and therefore geological realism of the updated random fields can be preserved. The present method is applied to two non-limiting example cases where permeability is updated using production data, and is shown to better reproduce complex geology compared to the standard EnKF, while providing a reasonable match to production data.

BRIEF DESCRIPTION OF THE DRAWINGS

A detailed description of the present invention is made with reference to specific embodiments thereof that are illustrated in the appended drawings. The drawings depict only typical embodiments of the invention and therefore are not to be considered to be limiting of its scope.

FIGS. 11a-11d show oil (111, 113, 115, 117) and water (112, 114, 116, 118) production rates for four wells for a final ensemble obtained with the EnKF of order 5, and that of the true permeability field (O's for oil rate, X's for water rate);

FIG. 14a shows a reference or "true" permeability field (left) for Example 2 and its histogram (FIG. 14b);

FIGS. 17a-17d show four realizations of a final ensemble (corresponding to the initial ensemble of FIGS. 16a-16d) obtained with the standard EnKF;

FIGS. 19a-19d show four realizations of a final ensemble (corresponding to the initial ensemble of FIGS. 16a-16d) obtained with the EnKF with order 7 polynomial kernel;

FIGS. 21a-21d show oil (211, 213, 215, 217) and water (212, 214, 216, 218) production rates for four wells for an initial ensemble, and that of a true permeability field (O's for oil rate, X's for water rate);

FIGS. 23a-23d show oil (231, 233, 235, 237) and water (232, 234, 236, 238) production rates for four wells for a final ensemble obtained with the EnKF of order 5, and that of a true permeability field (O's for oil rate, X's for water rate)

DETAILED DESCRIPTION

Figure 1A:
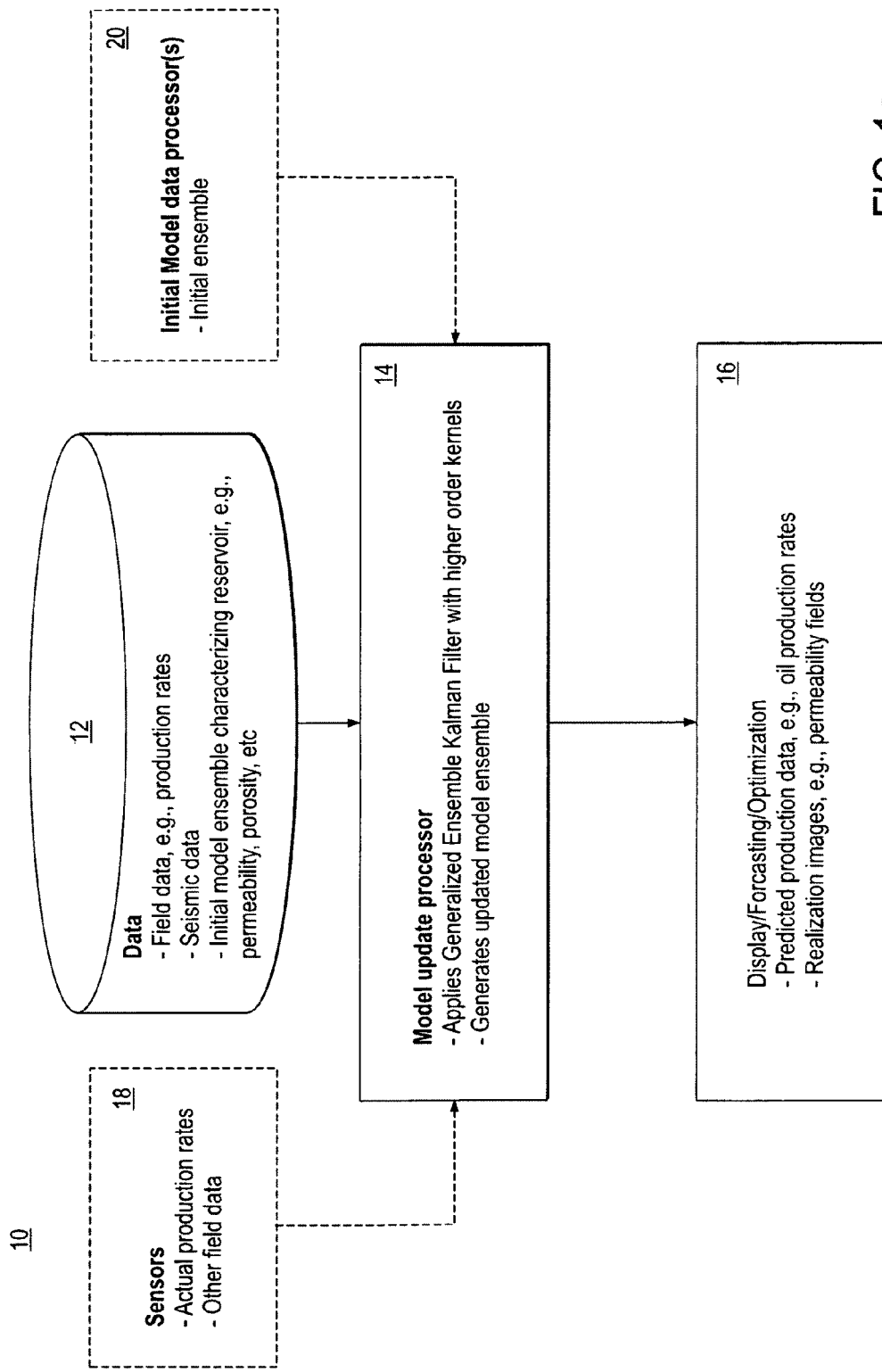
FIG. 1a is schematic diagram showing an implementation of the reservoir prediction system of the present invention.

The present invention may be described and implemented in the general context of instructions to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of computer processing system configurations, including but not limited to single and multi-processor systems, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1a shows an embodiment of system 10 for predicting fluid flow in a subterranean reservoir having non-Gaussian characteristics. For purposes of the invention described herein, "non-Gaussian characteristics" or features refers to permeability, porosity and other reservoir characteristics or features having non-linear, non-Gaussian geospatial distribution. The system includes one or more data sources 12, which can include electronically accessible or operator-entered data, for providing initial model ensemble, reservoir field data, including for example, oil production, water production, gas production and seismic data. The initial model ensemble includes initial reservoir characteristics, at a time $t_0$, derived by operators and/or computer modeling based on initial observations, knowledge or data gathered about the reservoir. The initial model ensemble may take into account initial estimates of permeability, porosity and other characteristics used to create simulation models of subterranean reservoirs. Optionally, a one or more initial model computer processors 20 having computer readable program code and one or more sensors 18 can be provided in lieu or in addition to data source 12.

System 10 further includes a model update processor 14, which can be or physically reside as part of processor 20, that is used for updating the initial model ensemble at a predetermined or user defined time $t_1$. The model update processor 14 includes model update program code for receiving the reservoir field data and initial model ensemble data from data source(s) 12, sensors 18 and/or initial model processor(s) 20. At time $t_1$, the model update program code of processor 14 updates the initial model ensemble at so as to preserve the non-Gaussian characteristics of the reservoir in the updated set of models, which enables enhanced accuracy and reliability of reservoir prediction data.

Figure 1B:
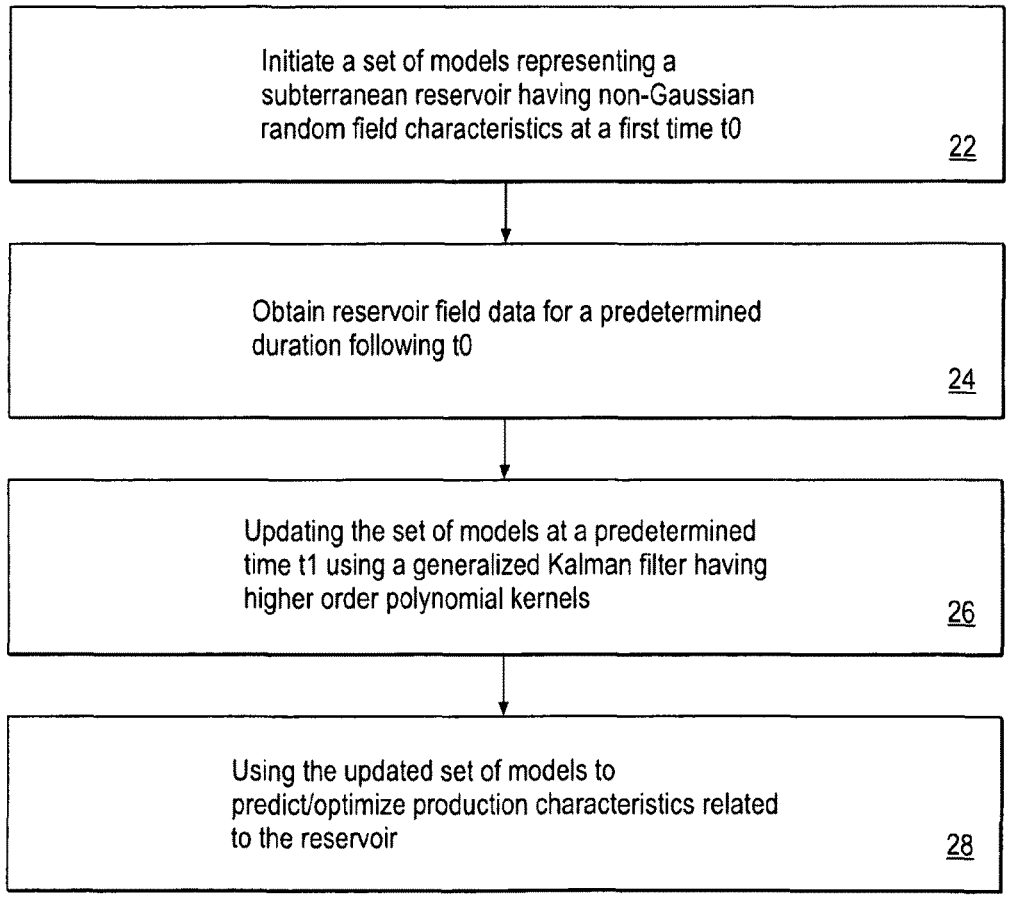
FIG. 1b is a flow diagram showing an example of a computer-implemented method for reservoir prediction in accordance with the present invention.

In accordance with a preferred embodiment of the present invention, the model update program code of processor 14 is programmed to implement steps 24, 26 and 28 shown in FIG. 1b. Updating of the initial model ensemble includes using model update code utilizing a generalized ensemble Kalman filter having higher order kernels. "Higher order" refers to any order greater than 1, which can be selected by the user. In a preferred embodiment, the kernels are polynomial kernels. The generalized ensemble Kalman filter includes a gain function adapted for reservoirs having non-Gaussian random field characteristics, as represented for example by Equation 19 shown below. The gain function can further be adapted for reservoirs having non-Gaussian production data characteristics, as shown for example by Equation 34 described below.

The generalized ensemble Kalman filter also includes an update model adapted for reservoirs having non-Gaussian random field characteristics, as shown by Equation 24. As with the gain function, the update model can also be adapted for reservoirs having non-Gaussian production data characteristics as shown by Equation 38 described below.

Referring again to FIG. 1a, system 10 includes display/forecasting/optimization processor(s) 16 having image realization program code, executable by 16. Again, processor 16 can be the same or part of one or more of processors 14 and 20. Processor(s) 16, via the image realization program code, transform the prediction data generated by the updated set of models into image data representations of the reservoir. The data representations are then communicated to image display mean for displaying the image representations of the reservoir. Output from the updated model ensemble can also be used for reservoir forecasting and optimization.

The Ensemble Kalman Filter

This section provides a brief description of the ensemble Kalman filter. More details can be found in Naevdal, G., Johnsen, L. M., Aanonsen, S. I., Vefring, E. H., Reservoir Monitoring and Continuous Model Updating Using Ensemble Kalman Filter, SPE paper 84372 presented at the SPE Annual Technical Conference and Exhibition, Denver, Colo., 2003 and Wen, X.-H., Chen, W. H., Real-time Reservoir Model Updating Using Ensemble Kalman Filter, paper SPE 92991 presented at the SPE Reservoir Simulation Symposium, Houston, Tex., 2005. The EnKF is a temporally sequential data assimilation method, and at each assimilation time, the following steps are performed: a forecast step (evaluation of the dynamic system), followed by a data assimilation step (calculation of Kalman gain), and then by an update of the state variables of the EnKF (Kalman update).

The state variables of the EnKF usually consist of the following types of variables: static variables (such as permeability, porosity), dynamic variables (such as pressure, saturation), and production data (such as bottom hole pressures, production and injection rates). Thus, the state vector of the EnKF at a given assimilation time can be written as:

$$y_j = \begin{bmatrix} m \\ x \\ d \end{bmatrix}_j \forall j = 1, \ldots, M \quad \text{(Equation 1)}$$

Here, $y_j \in R^{N_s}$ is the $j^{th}$ ensemble member, m are the static variables, x are the dynamic variables, and $d \in R^{N_d}$ are the production data to be assimilated. The number of ensemble members is M. Before the EnKF can be applied, an initial ensemble of the static and dynamic variables has to be created. Usually, geostatistical techniques are used to create the ensemble of static variables (permeability field etc.) corresponding to prior knowledge of the geology and hard data. However, the dynamic variables are usually considered known without uncertainty, primarily because the uncertainty of the dynamic variables such as pressure and saturation at the initial time is smaller compared to that of the static variables, as the reservoir is generally in dynamic equilibrium before start of production. In any case, if the initial dynamic variables are considered uncertain, it can be easily reflected through the initial ensemble. There is usually no production data available initially.

Once the initial ensemble is created, the forecast step can be performed, wherein the dynamic system (reservoir simulation model) is evaluated to the next assimilation time using the current estimates of the static and dynamic variables. The simulator has to be run once for each ensemble member (M times). This provides the forecasted dynamic variables and production data at the next assimilation step, and the step can be written compactly as:

$$y_{j,k}^f = f(y_{j,k-1}^u) \forall j=1, \ldots, M \quad \text{(Equation 2)}$$

Here $y^f$ is the forecasted state vector obtained after the forecast step, $y^u$ is the updated state vector obtained after the Kalman update, and subscript k stands for the assimilation time. f depicts the reservoir simulation equations. The assimilation time subscript k will be removed from discussions below for simplicity, and will only be shown when necessary.

After the forecasted state vector is obtained, the data assimilation step is performed, wherein, the Kalman gain is calculated using the static and dynamic variables and production data obtained from the forecast step, and is given as:

$$K_g = C_y^f H^T (H C_y^f H^T + C_e)^{-1} \quad \text{(Equation 3)}$$

Here, $K_g$ is known as the Kalman gain matrix, and is of size $N_s \times N_d$, and $C_y^f$ is the covariance matrix of $y^f$. Matrix H=[0|I], where 0 is a $N_d \times (N_s - N_d)$ matrix of zeros, and I is a $N_d \times N_d$ identity matrix. $C_e$ is the error covariance matrix of the production data d which is usually assumed to be diagonal (that is, data measurement errors are independent of each other). From the above, it is clear that $C_y^f H^T$ is the covariance matrix of the full forecasted state vector $y^f$ with the forecasted production data d and $H C_y^f H^T$ is the covariance matrix of forecasted production data d with itself. That is, defining the centered vectors, $\hat{y}^f = y^f - \overline{y}^f$ and $\hat{d} = d - \overline{d}$, we have:

$$C_y^f H^T = \frac{1}{M} \sum_{j=1}^{M} \hat{y}_j^f \hat{d}_j^T \quad \text{(Equation 4)}$$

$$H C_y^f H^T = \frac{1}{M} \sum_{j=1}^{M} \hat{d}_j \hat{d}_j^T \quad \text{(Equation 5)}$$

The final step of the EnKF is to update the state variables using the actual observations, which is given as:

$$y_j^u = y_j^f + K_g(d_{o,j} - d_j) \quad \text{(Equation 6)}$$

Here, $d_o$ are the observed production data, and random perturbations corresponding to $C_e$ are added to $d_o$ to create the ensemble of observed data, $d_{o,j}$. The updated state vector $y^u$ thus calculated is then used to evaluate the next forecast step, and the process repeated for the next assimilation time.

It is clear from Equation 6 that the updated state vectors are linear combinations of the forecasted state vectors. Further, because the EnKF only uses the covariance of the forecasted state vectors, it is technically appropriate only for multi-Gaussian random fields. In other words, the EnKF is only able to preserve two-point statistics or covariance of random fields. However, just preserving two-point statistics is not appropriate if the goal is to capture realistic geology with complex patterns of continuity (such as channels) that is characterized by multipoint statistics or non-Gaussian random fields (Sarma, P., Durlofsky, L., Aziz, K., A New Approach to Automatic History Matching using Kernel PCA, paper SPE 106176 presented at the SPE Reservoir Simulation Symposium, Houston, Tex., 2006; Sarma, P., Durlofsky, L. J., Aziz, K., Kernel Principal Component Analysis for an Efficient, Differentiable Parameterization of Multipoint Geostatistics, *Mathematical Geosciences*, 40, 3-32, 2008).

Generalized EnKF Using Kernels

The EnKF can be generalized to handle non-Gaussian random fields and multi-point statistics using kernel methods. In recent years, kernel methods have generated a lot of interest (Scholkopf, B., Smola, A., Muller, K., Nonlinear Component Analysis as a Kernel Eigenvalue Problem, *Neural Computation*, 10, 1299-1319, 1998 and Scholkopf, B., Smola, A. J., *Learning with Kernels*, MIT Press, Cambridge, Mass., 2002). The basic idea is to map the data in the input space $R^{N_s}$ to a so-called feature space F through a nonlinear map $\phi$, and then apply a linear algorithm in the feature space. The feature space F is chosen such that it is more appropriate to apply the linear algorithm in this space rather than in the input space $R^{N_s}$. This approach can be applied to any linear algorithm that can be expressed solely in terms of dot products without the explicit use of the variables themselves; thus kernel methods allow the construction of elegant nonlinear generalizations of linear algorithms (Scholkopf, B., Smola, A., Muller, K., Nonlinear Component Analysis as a Kernel Eigenvalue Problem, *Neural Computation*, 10, 1299-1319, 1998 and Scholkopf, B., Smola, A. J., *Learning with Kernels*, MIT Press, Cambridge, Mass., 2002). By replacing the dot product in the feature space with an appropriate kernel function, efficiency similar to the linear algorithm can be achieved. Well known examples of the application of kernel methods to linear algorithms to create nonlinear generalizations are support vector machines, kernel-based clustering, and kernel principal component analysis (Scholkopf, B., Smola, A., Muller, K., Nonlinear Component Analysis as a Kernel Eigenvalue Problem, *Neural Computation*, 10, 1299-1319, 1998 and Scholkopf, B., Smola, A. J., *Learning with Kernels*, MIT Press, Cambridge, Mass., 2002).

Consider the nonlinear mapping $\phi$ that maps the input space $R^{N_s}$ (state space of the EnKF) to another space F. That is:

$$\phi: R^{N_s} \to F; \; Y = \phi(y); \; y \in R^{N_s}, y \in F \quad \text{(Equation 7)}$$

F is called the feature space, and it could have an arbitrarily large dimensionality $N^F$ (Scholkopf, B., Smola, A., Muller, K., Nonlinear Component Analysis as a Kernel Eigenvalue Problem, *Neural Computation*, 10, 1299-1319, 1998; Sarma, P., Durlofsky, L. J., Aziz, K., Kernel Principal Component Analysis for an Efficient, Differentiable Parameterization of Multipoint Geostatistics, *Mathematical Geosciences*, 40, 3-32, 2008). The definition will become clearer when space F is associated with a kernel function below. Because state vector y consists of different kinds of variables (permeability, porosity, saturation etc.) with possibly different random fields, it may not be appropriate to have a single mapping $\phi$ that operates on y as a whole. Thus will consider the following mapping:

$$\phi(y) = \begin{bmatrix} \phi_m(m) \\ \phi_x(x) \\ \phi_d(d) \end{bmatrix} \quad \text{(Equation 8)}$$

For simplicity, the initial derivation of the kernel-based EnKF (KEnKF) will be carried out assuming that the production data is not mapped to any feature space, that is, $\phi_d(d) = d$ (implying that production data is assumed multi-Gaussian). This will be later extended to accommodate non-Gaussian production data.

Calculation of Kalman Gain in Feature Space

Defining the centered map $\hat{\phi}(y_j) = \phi(y_j) - \overline{\phi}$, $j=1, \ldots, M$, that is, $\hat{\phi}(y_j)$ are the centered counterparts of $\phi(y_j)$ about their mean $\overline{\phi}$ in F, the covariance matrix in the feature space F of size $N_F \times N_F$ can be written as:

$$\tilde{C}_y^f = \frac{1}{M} \sum_{j=1}^{M} \hat{\phi}(y_j) \hat{\phi}(y_j)^T \quad \text{(Equation 9)}$$

If the EnKF is applied in the feature space F instead of the original input space $R^{N_s}$, then similar to Equation 3, the Kalman gain equation in the feature space F can be written as:

$$\tilde{K}_g = \tilde{C}_y^f H^T (H \tilde{C}_y^f H^T + C_e)^{-1} \quad \text{(Equation 10)}$$

Here again, H=[0|I], but 0 is a $N_d \times (N_F - N_d)$ matrix of zeros, and I and $C_e$ are the same as before, as d is not mapped to a feature space, and $\tilde{K}_g$ is of size $N_F \times N_d$. Because $N_F$ could possibly be very large (Scholkopf, B., Smola, A. J., *Learning with Kernels*, MIT Press, Cambridge, Mass., 2002; Sarma, P., Durlofsky, L. J., Aziz, K., Kernel Principal Component Analysis for an Efficient, Differentiable Parameterization of Multipoint Geostatistics, *Mathematical Geosciences*, 40, 3-32, 2008), it may not be practically possible to calculate $\tilde{K}_g$ or $\tilde{C}_y^f$. The solution to this problem, which leads to the kernel-based EnKF equations, is to realize from Equation 9 that $\tilde{C}_y^f$, can only have a maximum rank of M as each column of $\tilde{C}_y^f$ is a linear combination of the $\hat{\phi}(y_j)$, j=1, ..., M vectors. Therefore $\tilde{K}_g$ also has a maximum rank of M.

Thus, if we write $\tilde{K}_g = [\tilde{k}_1, \ldots \tilde{k}_i, \ldots \tilde{k}_{N_d}]$, where $\tilde{k}_i$ is a column of $\tilde{K}_g$, then the above argument implies that for a given column $\tilde{k}_i$, there exists coefficients $\alpha_{ij}$, j=1, ..., M such that:

$$\tilde{k}_i = \sum_{j=1}^{M} \alpha_{ij} \hat{\phi}(y_j) \ \forall \ i = 1, \ldots, N_d \quad \text{(Equation 11)}$$

This can be compactly written as:

$$\tilde{k}_i = \Phi \alpha_i \ \forall i=1, \ldots, N_d; \text{ where } \Phi = [\hat{\phi}(y_1), \ldots, \hat{\phi}(y_M)];$$
$$\alpha_i = [\alpha_{i,1}, \ldots, \alpha_{i,M}]^T \quad \text{(Equation 12)}$$

Therefore, $\tilde{K}_g$ can be written as:

$$\tilde{K}_g = \Phi A; \text{ where } A = [\alpha_1, \ldots, \alpha_{N_d}] \quad \text{(Equation 13)}$$

From Equation 11, since $\tilde{k}_i$ lies in the span of $\hat{\phi}(y_j)$, j=1, ..., M, and using Equation 13, Equation 10 can be equivalently written as:

$$\hat{\phi}(y_k) \cdot \Phi A (H \tilde{C}_y^f H^T + C_e) = \hat{\phi}(y_k) \cdot \tilde{C}_y^f H^T \ \forall k=1, \ldots, M \quad \text{(Equation 14)}$$

The left hand side of Equation 14 can be compactly written as:

$$\Phi^T \Phi A (H \tilde{C}_y^f H^T + C_e) \quad \text{(Equation 15)}$$

Since we have $$\tilde{C}_y^f H^T = \frac{1}{M} \sum_{j=1}^{M} \hat{\phi}(y_j) \hat{d}_j^T$$

($\hat{d}_j = d_j - \bar{d}$ is centered as before) the right hand side of Equation 14 becomes:

$$\frac{1}{M} \sum_{j=1}^{M} \{\hat{\phi}(y_k) \cdot \hat{\phi}(y_j)\} \hat{d}_j^T \ \forall k = 1, \ldots, M \quad \text{(Equation 16)}$$

Defining $D = [\hat{d}_1, \ldots, \hat{d}_M]$, Equation 16 can be compactly written as:

$$\frac{1}{M} \Phi^T \Phi D^T \quad \text{(Equation 17)}$$

From Equations 14, 15 and 17, we obtain the following:

$$\Phi^T \Phi A (H \tilde{C}_y^f H^T + C_e) = \frac{1}{M} \Phi^T \Phi D^T \quad \text{(Equation 18)}$$

Since $\Phi^T \Phi$ is a non-zero positive definite matrix, it can be eliminated from both sides, and defining $C_d^f = H \tilde{C}_y^f H^T$ as the covariance matrix of size $N_d \times N_d$ of the forecasted production data d (again d is not mapped to any feature space), we finally obtain:

$$A = \frac{1}{M} D^T (C_d^f + C_e)^{-1} \quad \text{(Equation 19)}$$

This equation can be thought of as an equivalent of the Kalman gain equation, because after A is calculated, the Kalman gain can be calculated using Equation 13. However, as will be shown below, explicit calculation of the Kalman gain $\tilde{K}_g$ is not necessary, and the Kalman update can be performed directly using A. Because the calculation of A only involves the production data d and its covariances, and because d is not mapped to any feature space but is in the original input space, A can be calculated very efficiently. However, calculating the Kalman gain $\tilde{K}_g$ requires calculating the maps $\phi(y_j)$, j=1, ..., M. As mentioned earlier, because the dimension $N_F$ of $\phi(y)$ could be very large, it may be computationally intractable to calculate $\phi(y)$.

Kalman Update as a Pre-Image Problem

The Kalman update equation in feature space F is similar to the standard Kalman update equation given by Equation 6, and can be written as:

$$Y_j^u = \phi(y_j^f) + \tilde{K}_g(d_{o,j} - d_j) \ \forall j=1, \ldots, M \quad \text{(Equation 20)}$$

Using Equation 13, Equation 20 can be written as:

$$Y_j^u = \phi(y_j^f) + \Phi A(d_{o,j} - d_j) \ \forall j=1, \ldots, M \quad \text{(Equation 21)}$$

Defining $z_j = A(d_{o,j} - d_j)$, which is a vector of length M, Equation 21 can be written as:

$$Y_j^u = \phi(y_j^f) + \sum_{i=1}^{M} z_{ij} \{\phi(y_i^f) - \bar{\phi}\} \quad \text{(Equation 22)}$$

$$\forall \ j = 1, \ldots, M$$

Furthermore, defining $$\omega_j = \sum_{i=1}^{M} z_{ij},$$

Equation 22 can be simplified as;

$$Y_j^u = \sum_{i=1}^{M} b_{ij} \phi(y_i^f) \quad \text{(Equation 23)}$$

$$\forall \ j = 1, \ldots, M;$$

$$b_{ij} = \begin{cases} z_{ij} - \omega_j / M & \text{if } i \neq j \\ 1 + z_{ij} - \omega_j / M & \text{if } i = j \end{cases}$$

We observe that similar to the standard EnKF, the updated state vector $Y_j^u$ in the feature space is a linear combination of the $\phi$ maps of the forecasted state vectors in the feature space $\phi(y^f)$. We are, however, not interested in the updated state vector $Y_j^u$ in F, but are interested in the updated state vector $y_j^u$ in the original input space $R^{N_s}$. In order to obtain a updated state vector $y_j^u$ in the original input space $R^{N_s}$ that corresponds to the updated state vector $Y_j^u$ in F, an inverse φ map of $Y_j^u$ is required, that is, $y_j^u = \phi^{-1}(Y_j^u)$. This is known as the pre-image problem (Scholkopf, B., Smola, A., Muller, K., Nonlinear Component Analysis as a Kernel Eigenvalue Problem, *Neural Computation*, 10, 1299-1319, 1998; Kwok, J. T., Tsang, I. W., The Pre-Image Problem with Kernel Methods, *IEEE Transactions in Neural Networks*, 15, 1517-1525, 2004). However, again, due to the very large dimensionality of the feature space F, it may not be possible to calculate this pre-image, and further, such a pre-image may not even exist, or, if it exists, it may be non-unique (Scholkopf, B., Smola, A., Muller, K., Nonlinear Component Analysis as a Kernel Eigenvalue Problem, *Neural Computation*, 10, 1299-1319, 1998; Kwok, J. T., Tsang, I. W., The Pre-Image Problem with Kernel Methods, *IEEE Transactions in Neural Networks*, 15, 1517-1525, 2004). These issues can be addressed by solving a minimization problem, in which a vector y is sought such that the least-square error between φ(y) and $Y_j^u$ is minimized (Scholkopf, B., Smola, A., Muller, K., Nonlinear Component Analysis as a Kernel Eigenvalue Problem, *Neural Computation*, 10, 1299-1319, 1998; Kwok, J. T., Tsang, I. W., The Pre-Image Problem with Kernel Methods, *IEEE Transactions in Neural Networks*, 15, 1517-1525, 2004):

$$y_j^u = \underset{y}{\mathrm{argmin}}\, \rho(y) \qquad \text{(Equation 24)}$$
$$= \|\phi(y) - Y_j^u\|^2$$
$$= \phi(y) \cdot \phi(y) - 2Y_j^u \cdot \phi(y) + Y_j^u \cdot Y_j^u$$

Note that M such minimization problems have to be solved to obtain the M updated state vectors $y_j^u$, j=1, . . . , M. From Equation 23 and Equation 24, we obtain:

$$\rho(y) = \phi(y) \cdot \phi(y) - 2\sum_{i=1}^{M} b_{ij} \phi(y_i^f) \cdot \phi(y) + \Omega \qquad \text{(Equation 25)}$$
$$\forall\, j = 1, \ldots , M$$

Here Ω represents terms independent of y. A key observation here is that in order to calculate ρ(y), only the dot product of vectors in the feature space F are required; the explicit calculation of the map φ(y) is not required. This is extremely important, because as discussed earlier, it may be computationally intractable to calculate φ(y) due to its very large dimension. Since only the dot products in the space F are required to calculate ρ(y) and not φ(y) itself, this can be calculated very efficiently with what is known as a kernel function (Scholkopf, B., Smola, A., Muller, K., Nonlinear Component Analysis as a Kernel Eigenvalue Problem, *Neural Computation*, 10, 1299-1319, 1998; Scholkopf, B., Smola, A. J., *Learning with Kernels*, MIT Press, Cambridge, Mass., 2002):

$$(\Phi(y_j) \cdot \Phi(y_j)) = \psi(y_i, y_j) \qquad \text{(Equation 26)}$$

The kernel function $\psi(y_i, y_j)$ calculates the dot product in space F directly from the elements of the input space $R^{N_s}$ and can therefore be calculated very efficiently. That is, the right hand side of Equation 26 does not directly involve the mapping φ(y). Every kernel function satisfying Mercer's theorem is uniquely associated with a mapping φ (Scholkopf, B., Smola, A., Muller, K., Nonlinear Component Analysis as a Kernel Eigenvalue Problem, *Neural Computation*, 10, 1299-1319, 1998; Scholkopf, B., Smola, A. J., *Learning with Kernels*, MIT Press, Cambridge, Mass., 2002). In accordance to Equation 8, if we have different feature spaces for the static and dynamic variables and production data, it can be easily seen that the kernel function can be written as:

$$\psi(y_i, y_j) = \psi_m(m_i, m_j) + \psi_x(x_i, x_j) + \psi_d(d_i, d_j) \qquad \text{(Equation 27)}$$

Here $\psi_m$, $\psi_x$, and $\psi_d$ are the kernels function corresponding to $\phi_m$, $\phi_x$, and $\phi_d$. Note that since we assume Gaussian production data, $\psi_d(d_i, d_j) = d_i d_j$. From Equation 25 and Equation 26, we have:

$$\rho(y) = \psi(y, y) - 2\sum_{i=1}^{M} b_{ij} \psi(y_i^f, y) + \Omega \qquad \text{(Equation 28)}$$
$$\forall\, j = 1, \ldots , M$$

The minimum of the objective function ρ(y) can be obtained by setting its gradient to zero, resulting in the following equation:

$$\frac{d\psi(y, y)}{dy} - 2\sum_{i=1}^{M} b_{ij} \frac{d\psi(y_i^f, y)}{dy} = 0 \qquad \text{(Equation 29)}$$
$$\forall\, j = 1, \ldots , M$$

This equation can be thought of as equivalent to the Kalman update equation, as the solution of this equation provides the updated state vectors $y_j^u$ in the input space. It is clear from Equation 29 that depending on the nature of the kernel function, $y^u$ could be a linear or nonlinear combination of the forecasted state vectors $y^f$. Further, this is clearly a generalization of the EnKF, because by choosing different kernel functions, different versions of the EnKF can be obtained.

Preserving Multi-Point Statistics Using Polynomial Kernels

The above section describes the development of the Kalman update equation in terms of kernel functions without specifying the form the kernel function itself. Although there are various kinds of kernel functions available in literature (Scholkopf, B., Smola, A. J., *Learning with Kernels*, MIT Press, Cambridge, Mass., 2002), the kernel function of interest in this work is the polynomial kernel, defined as (Sarma, P., Durlofsky, L. J., Aziz, K., Kernel Principal Component Analysis for an Efficient, Differentiable Parameterization of Multipoint Geostatistics, *Mathematical Geosciences*, 40, 3-32, 2008):

$$(\Phi(y_i) \cdot \Phi(y_j)) = \psi(y_i, y_j) = \sum_{k=1}^{q} (y_i \cdot y_j)^k \qquad \text{(Equation 30)}$$

Note that, for simplicity, the above equation and the derivation below assumes a single kernel function for the entire state vector y. If as in Equation 8, m, x, and d have separate feature spaces and associated kernel functions, the derivation below can be easily extended to account for this using Equation 27.

For the kernel function defined by Equation 30, it can be shown that for q=1, the feature space F is the same as the input space $R^{N_s}$, and as a result, the kernel formulation of the EnKF reduces to the standard EnKF. Therefore, for q=1, the covariance matrix $\tilde{C}_y^f$ is the standard covariance matrix used in the usual EnKF, and thus includes $2^{nd}$ order moments or two-point statistics of the random field of which $y_j^f$ are members. For q>1, the covariance matrix $\tilde{C}_{y'}^f$ in the feature space F includes up to $2q^{th}$ order moments of the random field of which are members $y_j^f$, and thus, if the key features of $y_j^f$ are represented by these higher order moments (or multi-point statistics), it then becomes possible to preserve these during the Kalman update.

For the polynomial kernel defined in Equation 30, the Kalman update equation defined in Equation 29 can be written as:

$$\sum_{k=1}^{q} k(y \cdot y)^{k-1} y - \sum_{i=1}^{M} b_{ij} \sum_{k=1}^{q} k(y_i^f \cdot y)^{k-1} y_i^f = 0 \quad \text{(Equation 31)}$$

$$\forall j = 1, \ldots, M$$

This is equivalent to the Kalman update equation for this particular kernel function. Note that for q>1, Equation 31 gives the updated state vector $y_j^u$ as a nonlinear combination of $y_j^u \forall j=1, \ldots, M$. One approach to solve Equation 31 for $y_j^u$ efficiently is to apply a fixed-point iteration method (Scholkopf, B., Smola, A., Muller, K., Nonlinear Component Analysis as a Kernel Eigenvalue Problem, *Neural Computation*, 10, 1299-1319, 1998), wherein the iteration scheme is given as:

$$y^{n+1} = \frac{\sum_{i=1}^{M} b_{ij} \sum_{k=1}^{q} k(y_i^f \cdot y^n)^{k-1} y_i^f}{\sum_{k=1}^{q} k(y^n \cdot y^n)^{k-1}} \quad \text{(Equation 32)}$$

$$\forall j = 1, \ldots, M$$

Unfortunately, this iteration scheme is quite unstable and does not converge for the above kernel, although the method is quite stable for other kernels such as the Gaussian kernel (Scholkopf, B., Smola, A., Muller, K., Nonlinear Component Analysis as a Kernel Eigenvalue Problem, *Neural Computation*, 10, 1299-1319, 1998). This problem can be eliminated by applying an approach similar to successive over relaxation used for the solution of systems of linear equations (Aziz, K., Settari, A., *Petroleum Reservoir Simulation*, Chapman and Hall, 1979):

$$y^{n+1} = \frac{\theta}{1+\theta} y^n + \frac{1}{1+\theta} \frac{\sum_{i=1}^{M} b_{ij} \sum_{k=1}^{q} k(y_i^f \cdot y^n)^{k-1} y_i^f}{\sum_{k=1}^{q} k(y^n \cdot y^n)^{k-1}} \quad \text{(Equation 33)}$$

$$\forall j = 1, \ldots, M$$

Here, θ is known as a relaxation factor. Equation 33 is used for updating the state vectors in the examples below, and θ=6 seemed to work quite well for all polynomial kernels applied in the examples. Note that a larger θ gives more weight to the last iterate $y^n$ and is more stable, but takes more iterations to converge. In terms of efficiency, because of the iterative nature of Equation 33, it is more expensive to solve than the standard Kalman update equation, however, because the forecast step requires running the reservoir simulator which is much more expensive, overall efficiency is not much affected.

Note that while the preferred embodiment of the invention described herein applies polynomial kernels, the scope of the present invention is=not limited to this type of kernel function. Other kernel functions, such as RBF, exponential, sigmoid kernels, and other kernel functions satisfying Mercer's theorem could be used and are within the scope of the claimed invention.

Extension to Non-Gaussian Production Data

In the previous derivations, the production data d was assumed to be Gaussian, and was therefore not mapped to any feature space. In the event that this assumption is not appropriate, the above derivations can be extended to account for non-Gaussian characteristics of the production data d by mapping it to an appropriate feature space through the mapping $\phi_d(d)$. An approach similar to above can be applied to arrive at the equivalent of the Kalman gain equation for non-Gaussian d, and therefore, without delving into details of the derivation, the final equivalent of the Kalman gain equation is given as:

$$\left\{ \frac{1}{M} \Psi^2 + \frac{1}{\sigma^2} \Psi \right\} B = \frac{1}{M} \Psi \quad \text{(Equation 34)}$$

Here, $\Psi$ is the M×M centered kernel matrix of the forecasted production data, that is:

$$\Psi: \Psi_{i,j} \hat{\phi}_d(d_i) \cdot \hat{\phi}_d(d_j) = \overline{\psi}(d_i, d_j); i=1, \ldots, M; j=1, \ldots, M \quad \text{(Equation 35)}$$

The relationship between the centered and non-centered kernel matrix is given as (Kwok, J. T., Tsang, I. W., The Pre-Image Problem with Kernel Methods, *IEEE Transactions in Neural Networks*, 15, 1517-1525, 2004):

$$\overline{\psi}(d_i, d_j) = \psi(d_i, d_j) - \frac{1}{M} 1^T \Psi_{d_i} - \frac{1}{M} 1^T \Psi_{d_j} + \frac{1}{M^2} 1^T \Psi 1 \quad \text{(Equation 36)}$$

Here, $1=[1, 1, \ldots, 1]^T$ is a M×1 vector, $\psi_d = [\psi(d, d_1), \ldots, \psi(d, d_M)]^T$ is also a M×1 vector, and $\Psi$ is the M×M non-centered kernel matrix, defined as, $\Psi: \Psi_{ij} = \phi_d(d_i) \cdot \phi_d(d_j) = \psi(d_i, d_j)$.

In the above derivation given by Equation 34, it is assumed that the error covariance matrix of $\phi_d(d)$ is diagonal with variance $\sigma^2$. Equation 34 can be considered equivalent to the Kalman gain equation, because, after the coefficient matrix B is calculated using Equation 34, the Kalman gain matrix in feature space F can be calculated as:

$$\tilde{K}_g = \Phi B^T \Phi_d^T; \text{ where } \Phi_d = [\hat{\phi}_d(d_1), \ldots, \hat{\phi}_d(d_M)] \quad \text{(Equation 37)}$$

However, as before, it is neither necessary nor possible to calculate this Kalman gain matrix, and the updated state vectors can be obtained directly using B within a pre-image problem.

The Kalman update equation in feature space F in this case can be written as:

$$Y_j^u = \phi(y_j^f) + \tilde{K}_g(\phi_d(d_{o,j}) - \phi_d(d_j)) \forall j=1, \ldots, M \quad \text{(Equation 38)}$$

Using Equation 37, it is shown that Equation 38 can be reduced exactly to the same form as Equation 22, but with $z_j$ defined as:

$$z_j = B^T(\Psi_{d_{o,j}} - 1\lambda_{d_{o,j}} - \Psi_{d_j} + 1\lambda_{d_j}) \quad \text{(Equation 39)}$$

where $$\lambda_d = \frac{1}{M}\sum_{i=1}^{M} \psi(d, d_i)$$

Once $z_j$ is calculated, the rest of the pre-image problem can be solved in exactly the same way as already described above to obtain the updated state vectors $y_j^u$.

Results Using Kernel-based EnKF

In this section we apply the kernel-based EnKF to estimate the permeability fields of two synthetic water flooded reservoirs and demonstrate the ability of the KEnKF to preserve complex geological structures while providing reasonable matches to the production data.

Example 1

Channel Sand Model

The simulation model for this example represents a simple 2D horizontal square reservoir covering an area of 450×450 m² with a thickness of 10 m, and is modeled by a 45×45×1 horizontal 2D grid. The fluid system is essentially an incompressible two-phase unit mobility oil-water system, with zero connate water saturation and zero residual oil saturation. The reservoir is initially saturated with oil at a constant pressure of 5800 psi at the top.

Figure 2A:
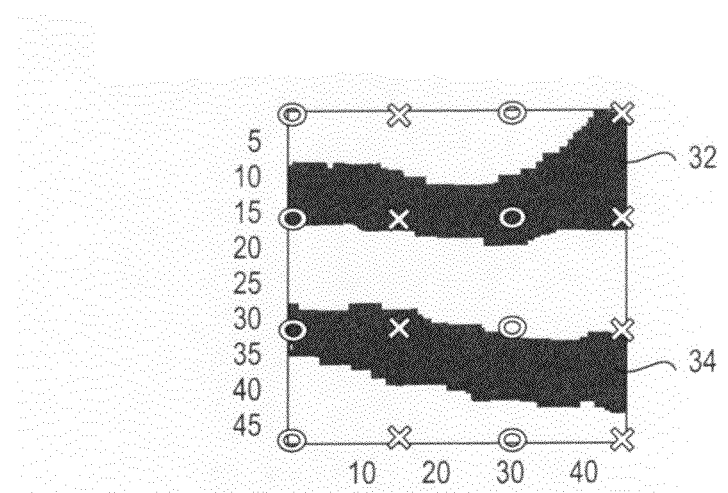
FIG. 2a shows a reference or "true" permeability field (left) for Example 1 and its histogram (FIG. 2b)
Figure 2B:
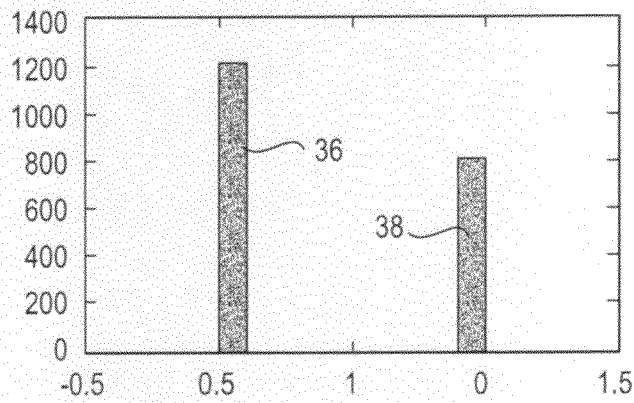
FIG. 2c shows a channel training image used for Example 1.
Figure 2C:
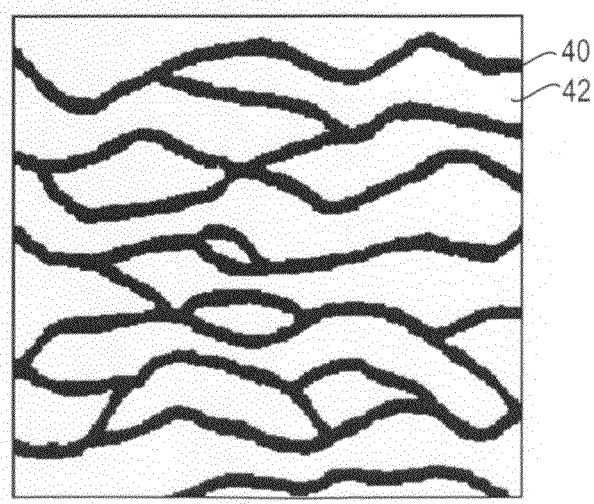
Figure 3A:
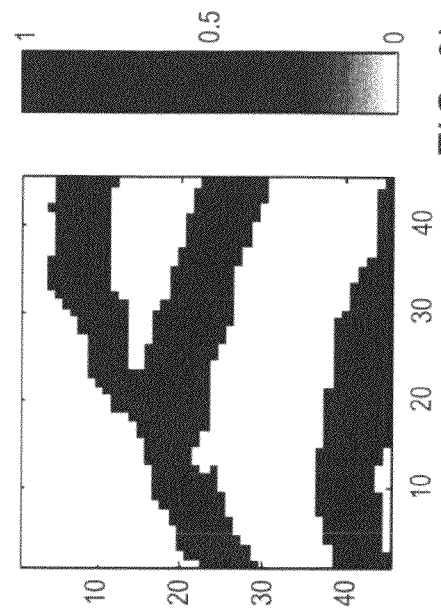
FIGS. 3a-3d show four realizations from an exemplary initial ensemble or realizations.
Figure 3B:
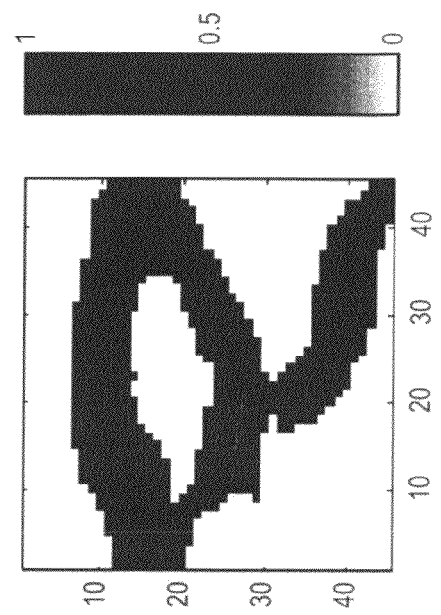
Figure 3C:
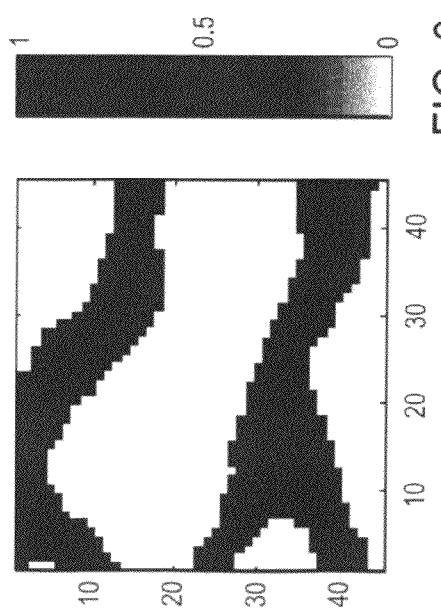
Figure 3D:
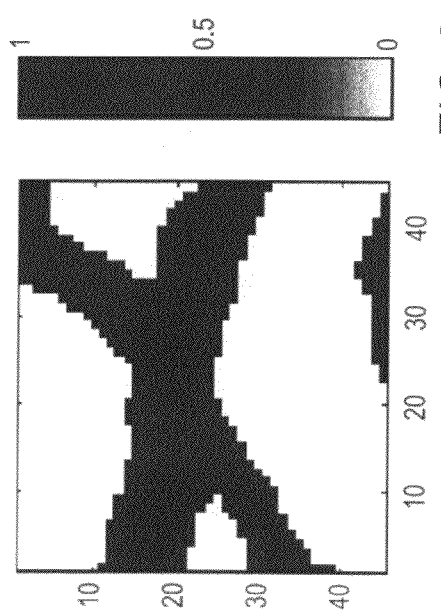
Figure 4A:
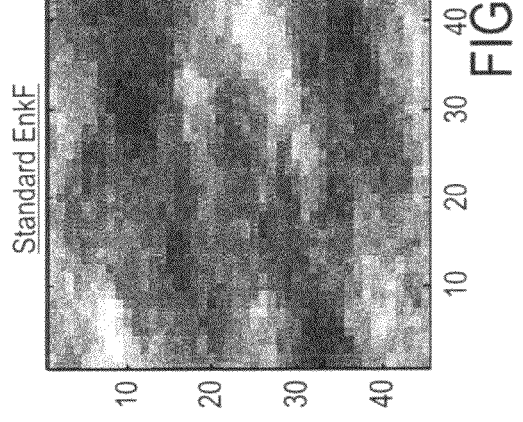
FIGS. 4a-4d show four realizations of a final ensemble (corresponding to the initial ensemble of FIGS. 3a-3d) obtained with the standard EnKF.
Figure 4B:
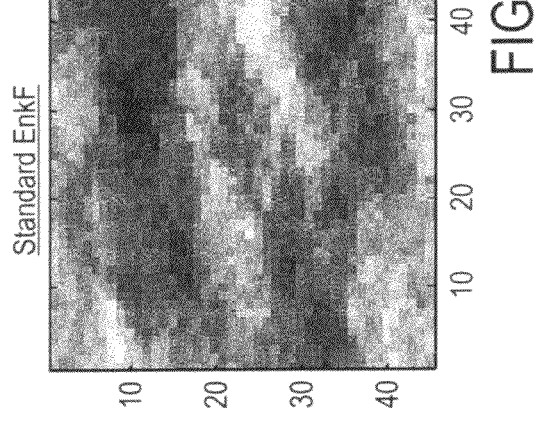
Figure 4C:
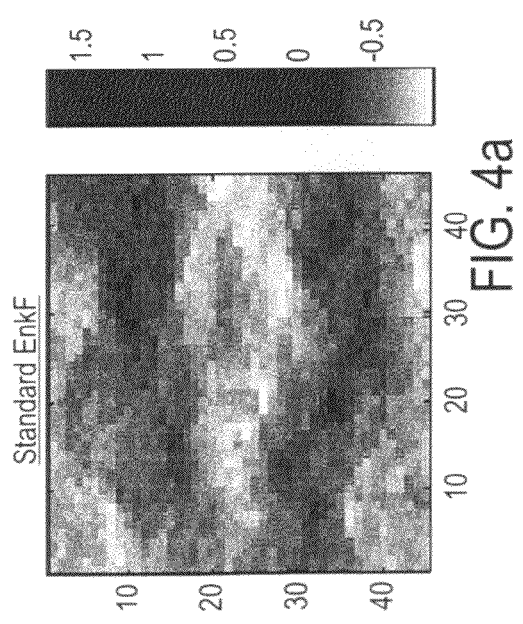
Figure 4D:
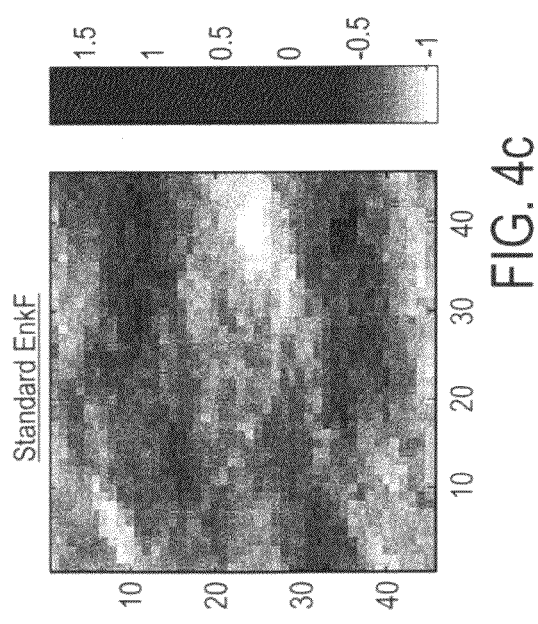
Figure 5A:
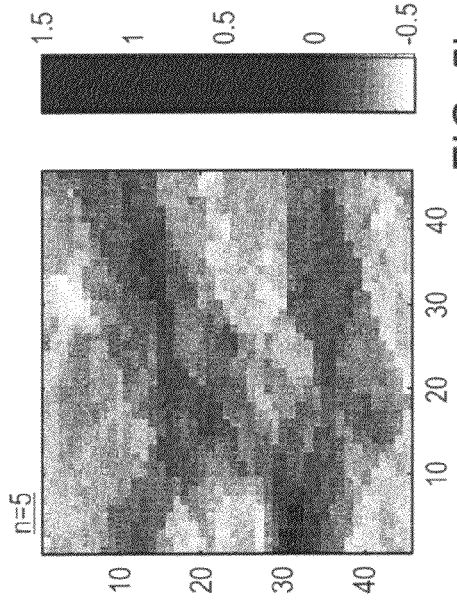
FIGS. 5a-5d show four realizations of a final ensemble (corresponding to the initial ensemble of FIGS. 3a-3d) obtained with the EnKF with order 5 polynomial kernel.
Figure 5B:
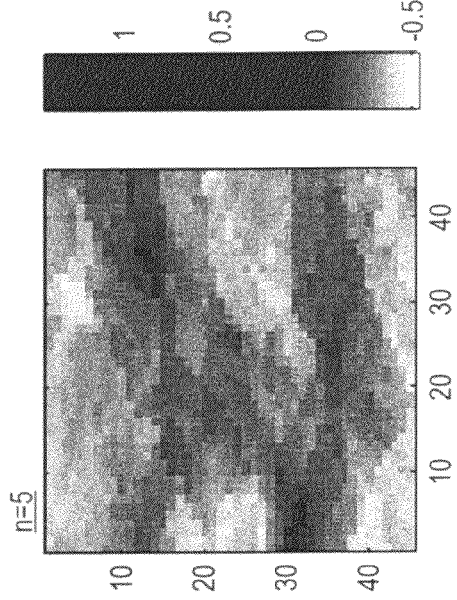
Figure 5C:
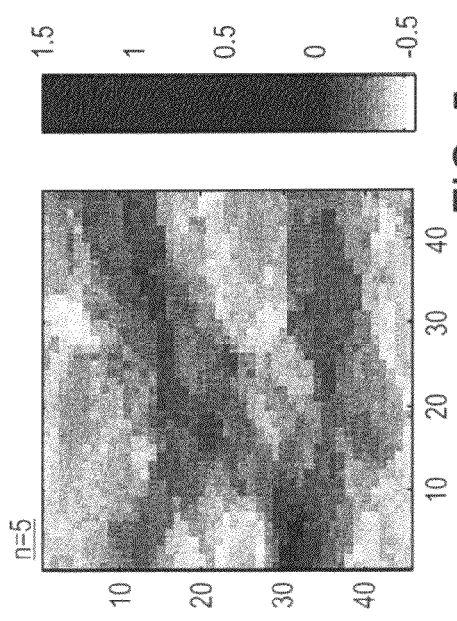
Figure 5D:
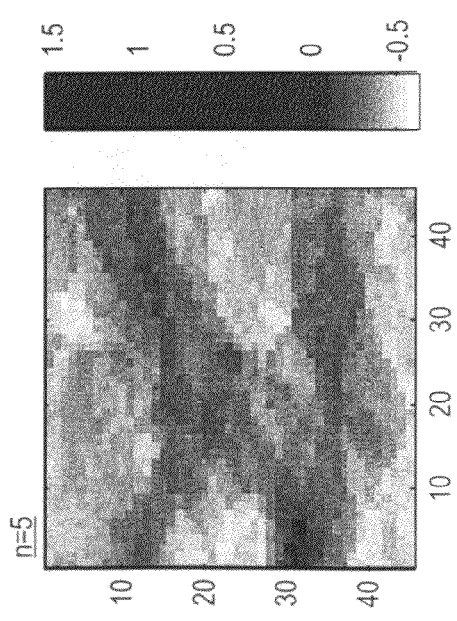
Figure 6A:
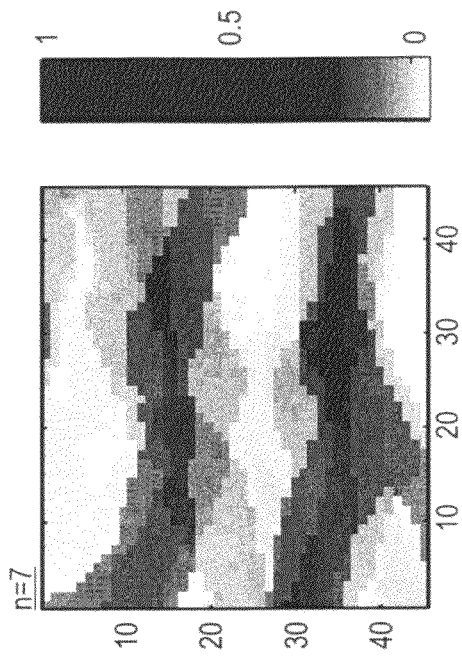
FIGS. 6a-6d show four realizations of a final ensemble (corresponding to the initial ensemble of FIGS. 3a-3d) obtained with the EnKF with order 7 polynomial kernel.
Figure 6B:
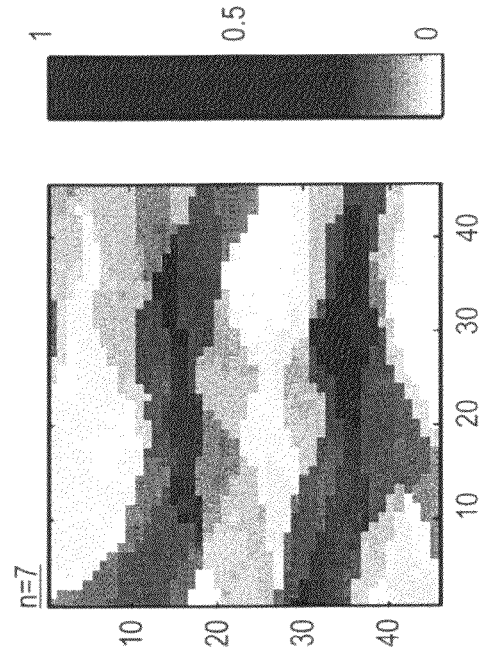
Figure 6C:
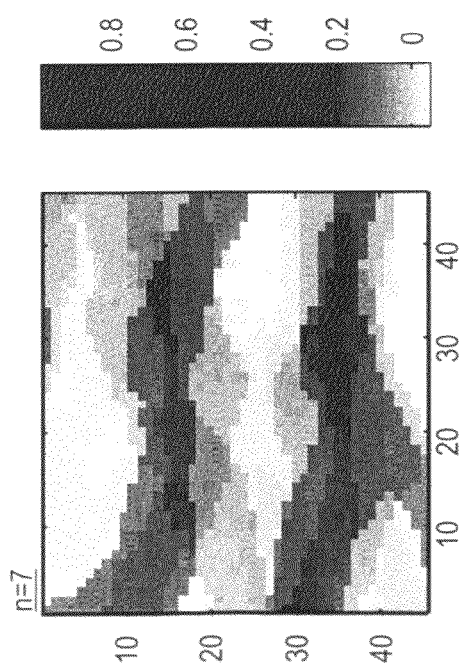
Figure 6D:
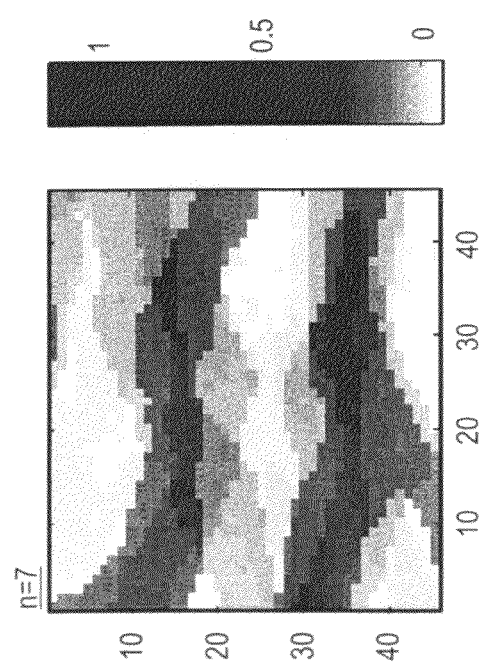
Figure 7A:
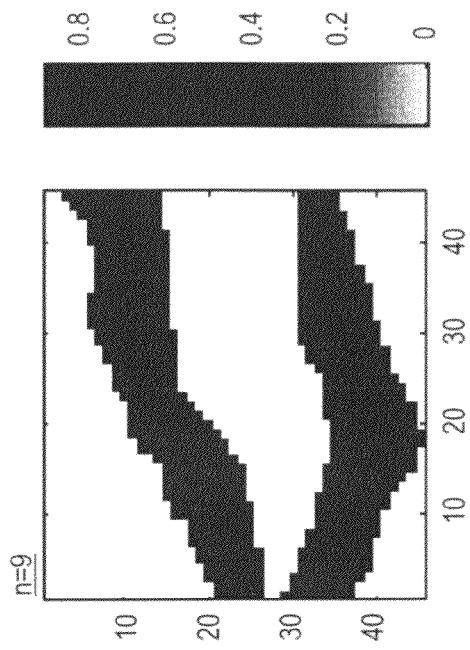
FIGS. 7a-7d show four realizations of a final ensemble (corresponding to the initial ensemble of FIGS. 3a-3d) obtained with the EnKF with order 9 polynomial kernel.
Figure 7B:
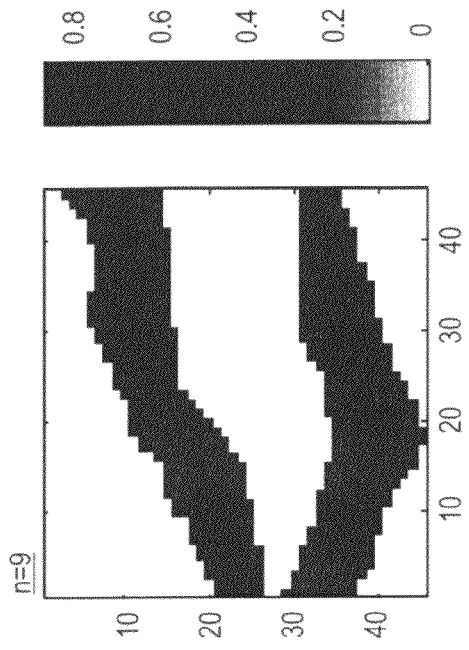
Figure 7C:
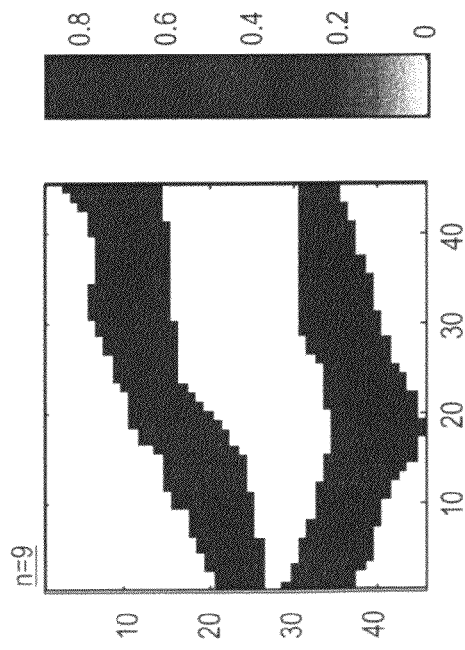
Figure 7D:
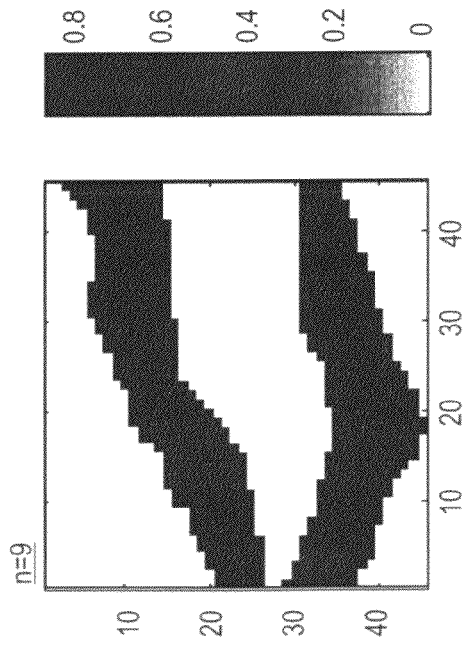

The reference or "true" permeability field is that of a fluvial channelized reservoir shown in FIGS. 2a and 2b, and is obtained using the training image in FIG. 2c with the multipoint geostatistical software snesim (Strebelle, S., Conditional Simulation of Complex Geological Structures using Multiple-point Statistics, *Mathematical Geology*, 34, 1-22, 2002). In FIG. 2a, high permeability sand is depicted by region 32 and the low permeability background is depicted by region 34. The sand and background are assumed to be homogeneous and isotropic with permeability of the sand being 10 D and the background permeability being 500 mD. FIG. 2b shows the binary histogram of the permeability field. Such a binary and discontinuous permeability field is purposefully chosen because the discontinuous nature of such random fields is quite difficult to preserve with continuous linear algorithms like the EnKF, and thus can be considered an effective case to demonstrate the applicability of the KEnKF.

The reservoir has 8 injectors and 8 producers placed in a line drive pattern as shown in FIG. 2a, where the black circles (O's) represent producers and black crosses (X's) represent injectors. The model is run for 1900 days with the true permeability field, with the injectors under water rate control at 100 bbd and the producers under bottom hole pressure (BHP) control at 5789 psi. This provides the true observed data that consists of the injector BHPs and producer oil and water production rates. Gaussian noise with standard deviation of 1 psi and 1 bbd are added to this injection BHPs and production rates respectively to obtain the ensemble of observed data.

An initial ensemble of 100 permeability fields are obtained using snesim with the same training image as in FIG. 2c, and four of these realizations are shown in FIG. 3a-3d. High permeability sand is depicted by region 40, and the low permeability background is depicted by region 42. The information conveyed by the training image can be thought of as our prior geological knowledge of the reservoir, that is, we assume that we know that there are channels in the reservoir (say from outcrop data), and by integrating this knowledge with the observed dynamic data, we are trying to obtain a posterior estimate of the locations and sinuosity of the channels, conditioned to both our prior knowledge and observations.

Figure 8A:
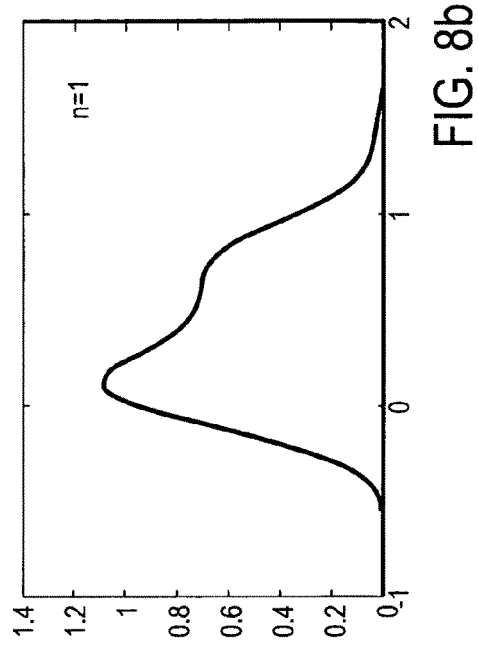
FIGS. 8a-8d show typical marginal distributions of a final ensemble (corresponding to the initial ensemble of FIGS. 3a-3d) obtained with polynomial kernels of order 1 (FIG. 8a), order 5 (FIG. 8b), order 7 (FIG. 8c) and order 9 (FIG. 8d)
Figure 8B:
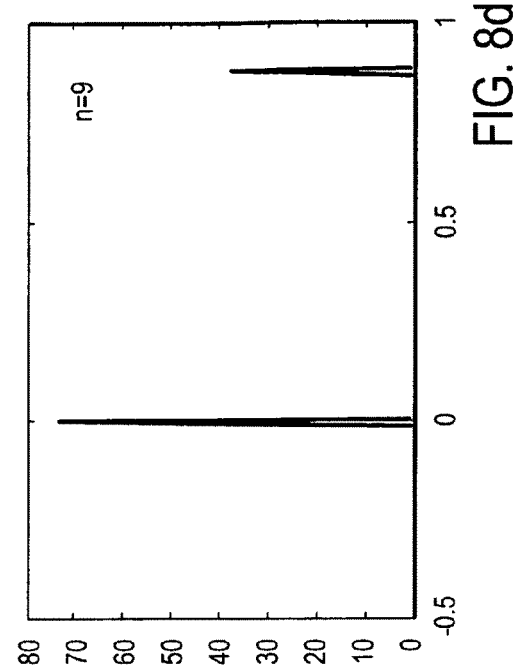
Figure 8C:
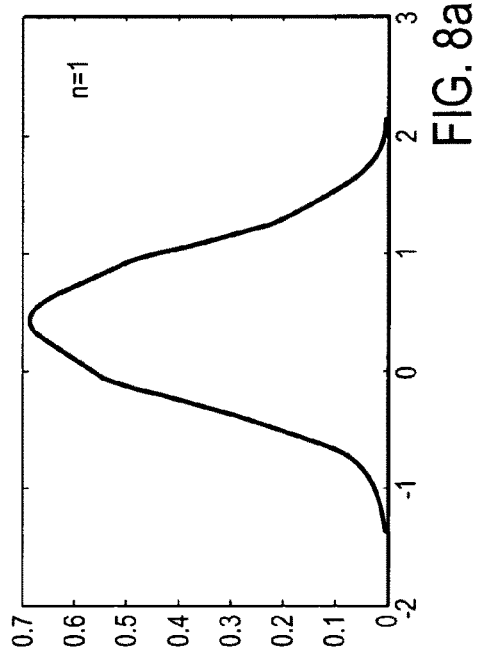
Figure 8D:
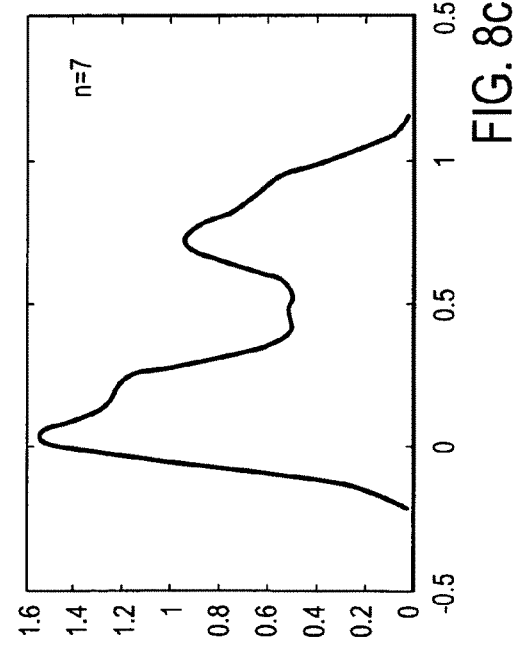
Figure 9A:
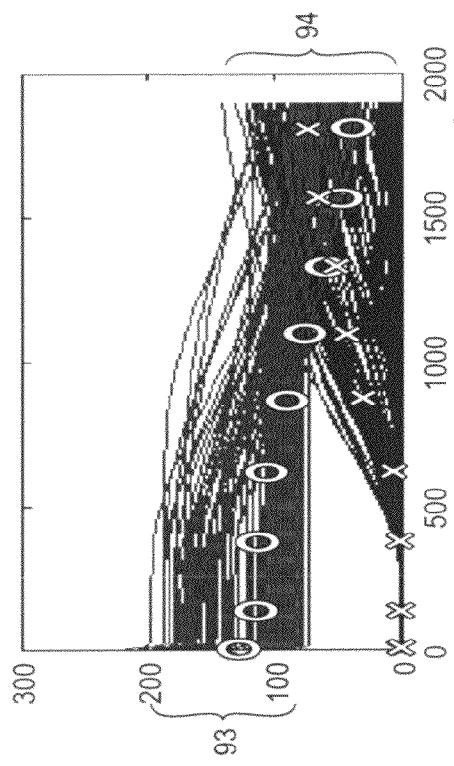
FIGS. 9a-9d show oil (91, 93, 95, 97) and water (92, 94, 96, 98) production rates for four wells for an initial ensemble, and that of the true permeability field (O's for oil rate, X's for water rate)
Figure 9B:
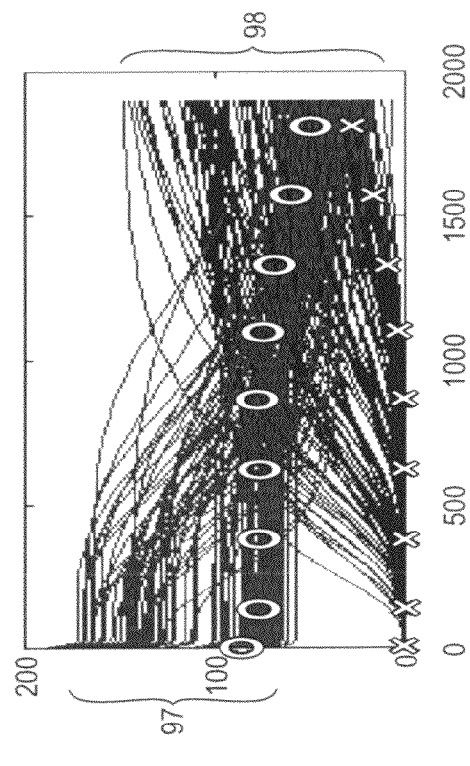
Figure 9C:
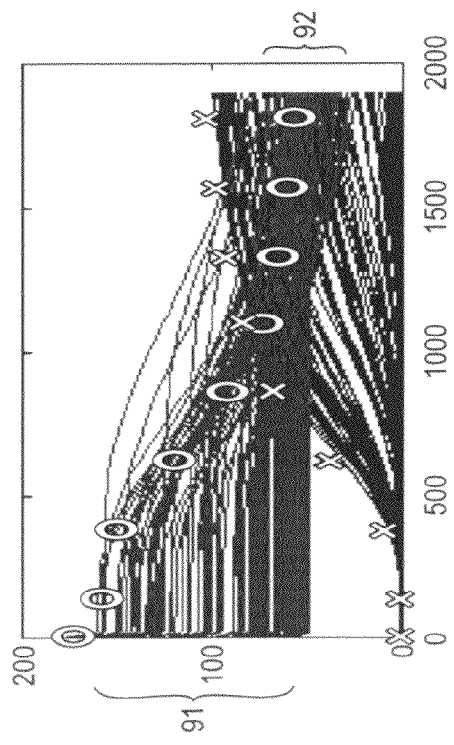
Figure 9D:
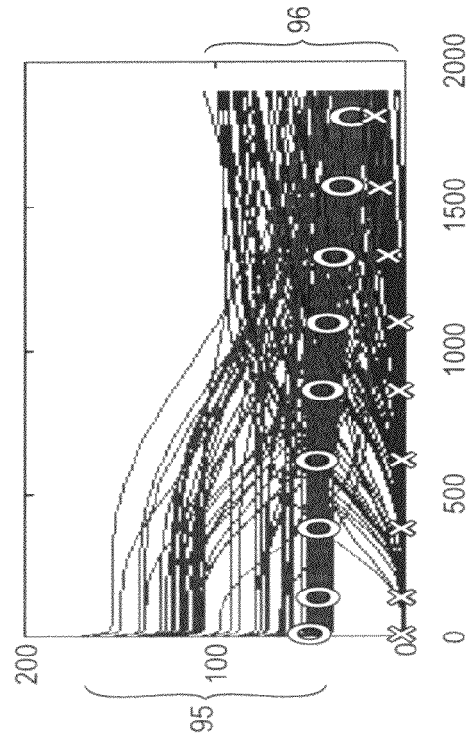
Figure 10A:
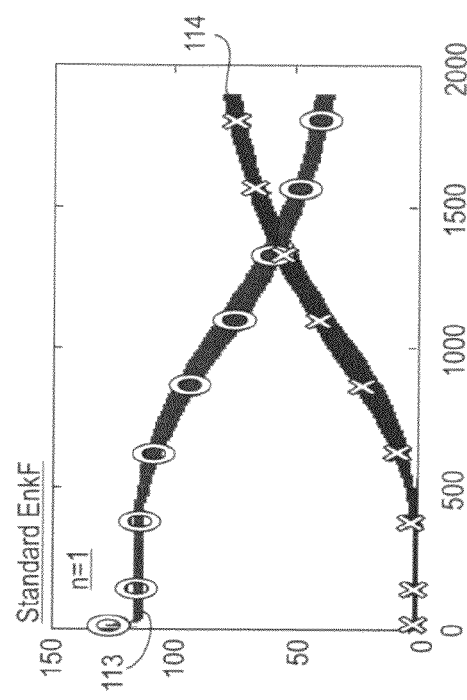
FIGS. 10a-10d show oil (101, 103, 105, 107) and water (102, 104, 106, 108) production rates for four wells for a final ensemble obtained with the standard EnKF, and that of the true permeability field (O's for oil rate, X's for water rate)
Figure 10B:
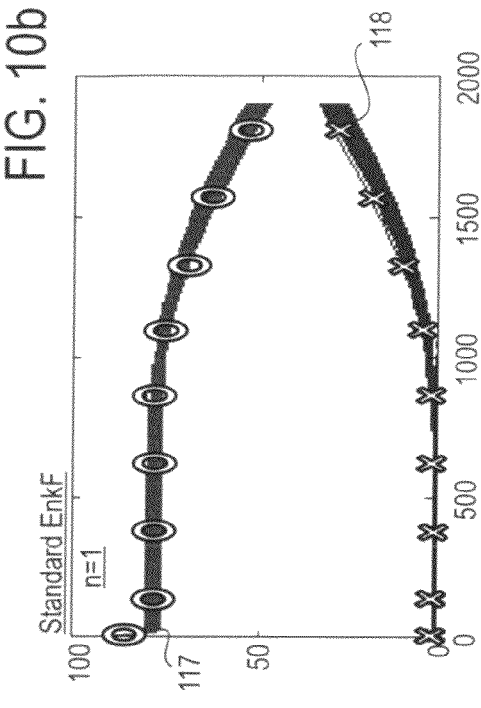
Figure 10C:
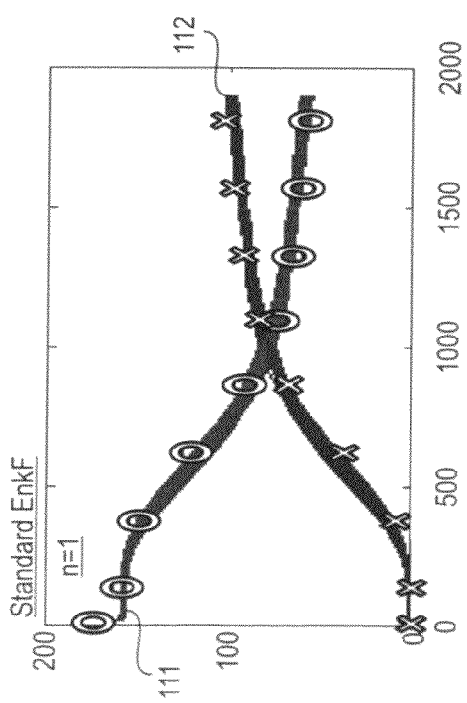
Figure 10D:
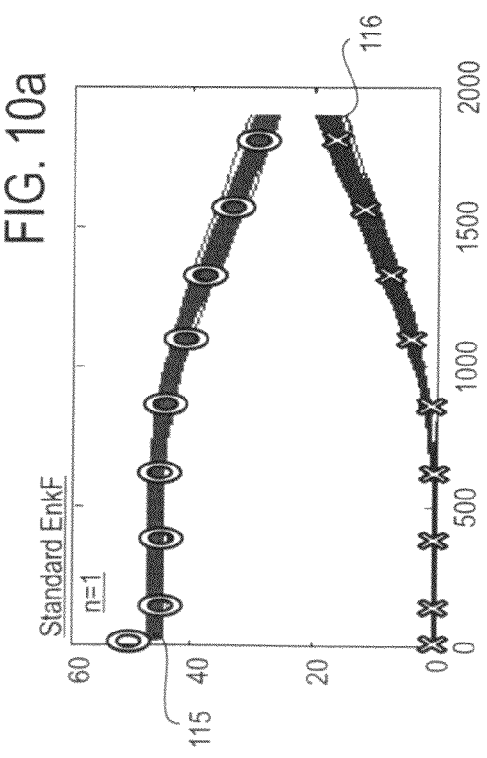
Figure 12A:
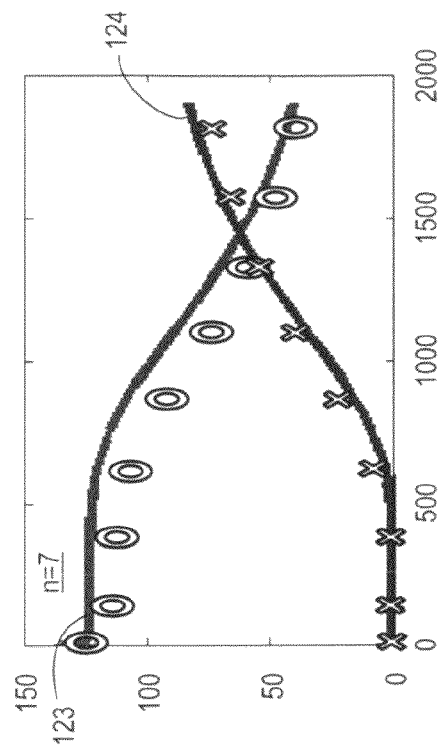
FIGS. 12a-12d show oil (121, 123, 125, 127) and water (122, 124, 126, 128) production rates for four wells for a final ensemble obtained with the EnKF of order 7, and that of the true permeability field (O's for oil rate, X's for water rate)
Figure 12B:
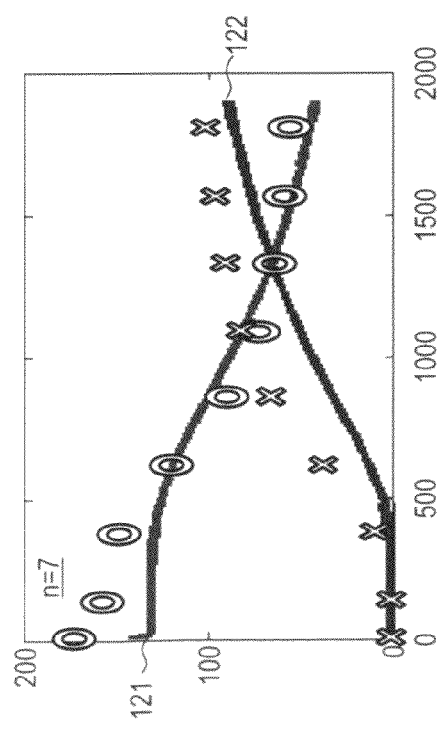
Figure 12C:
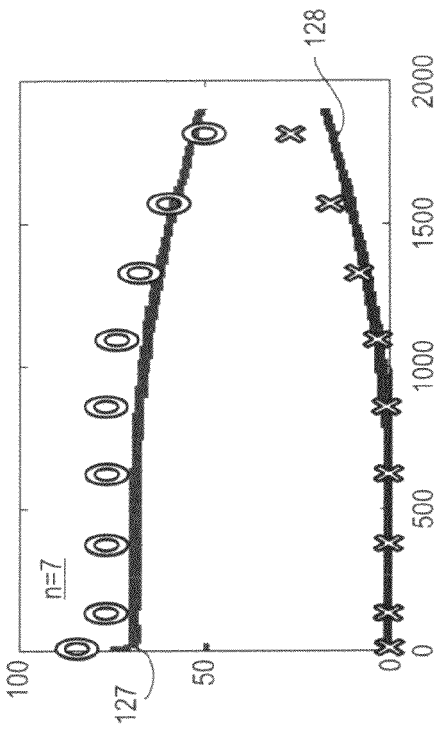
Figure 12D:
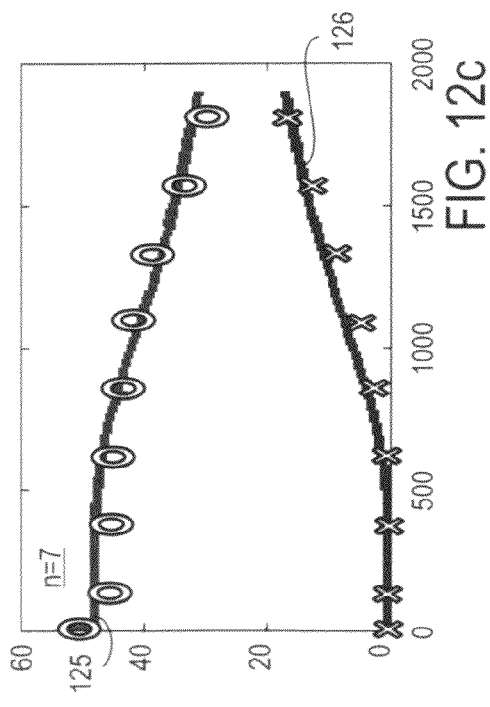
Figure 13A:
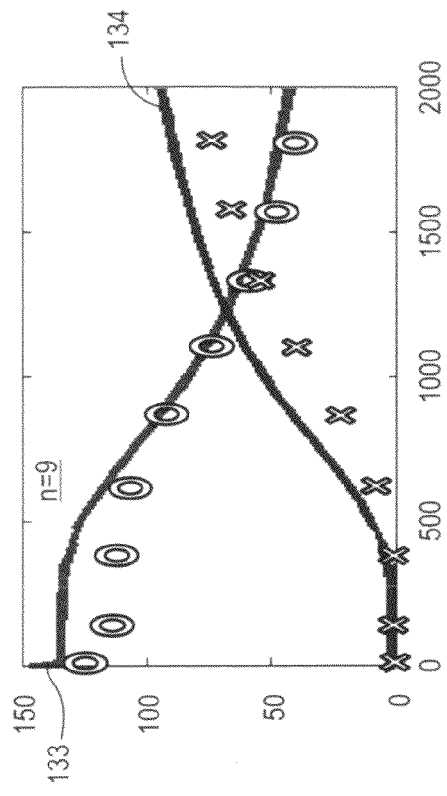
FIGS. 13a-13d show oil (131, 133, 135, 137) and water (132, 134, 136, 138) production rates for four wells for a final ensemble obtained with the EnKF of order 9, and that of a true permeability field (O's for oil rate, X's for water rate)
Figure 13B:
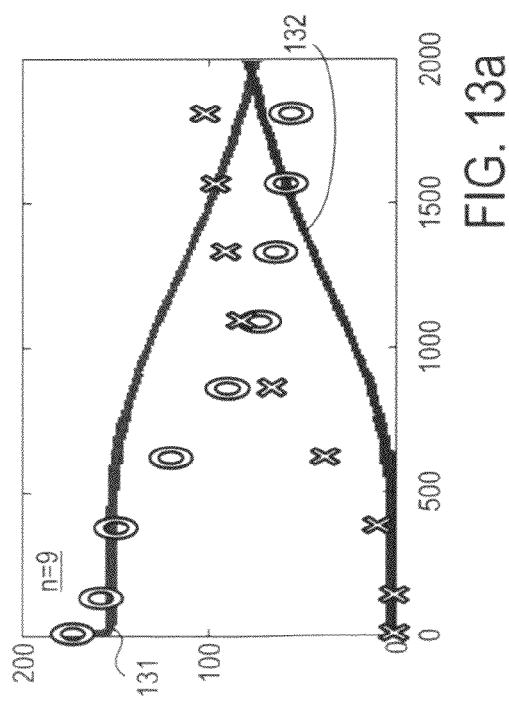
Figure 13C:
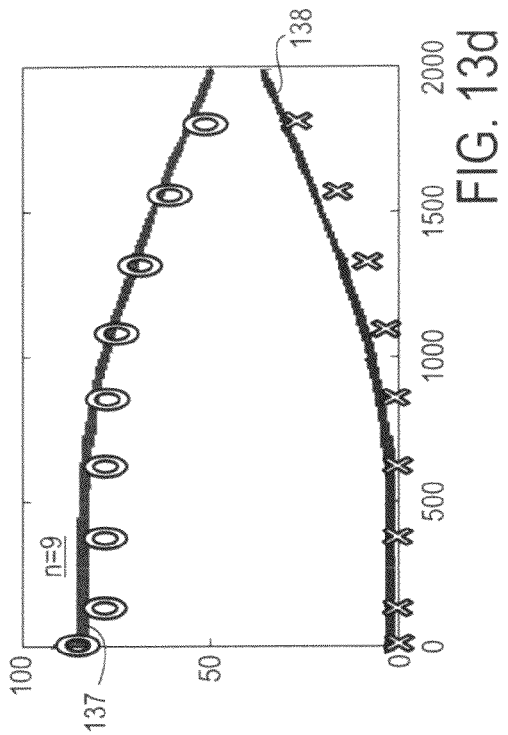
Figure 13D:
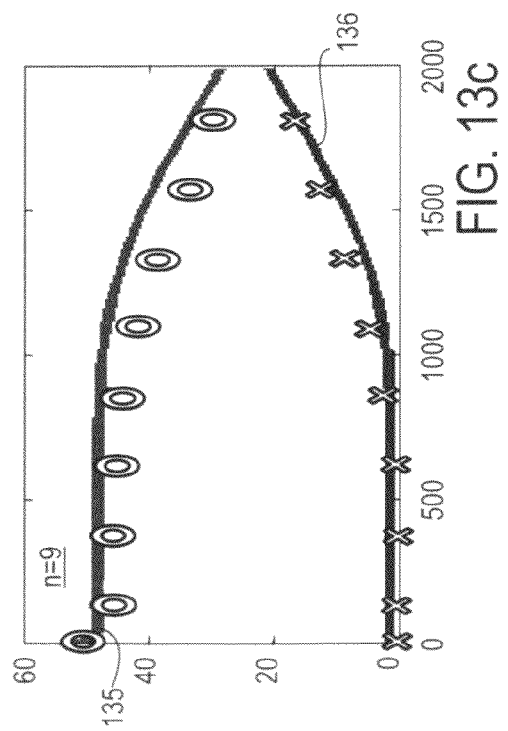

The KEnKF is applied to this ensemble over 10 assimilation steps of 190 days each. FIG. 4-7 show four updated realizations each of the final ensemble obtained with polynomial kernels of order 1 (that is, the standard EnKF), order 5, order 7 and order 9 respectively. We observe that although the standard EnKF is able to produce realizations that have some channel like structure with longer correlations in the direction of the channels, the realizations clearly look quite Gaussian, and this is also verified from the Gaussian marginal distribution of one of the realizations as seen in FIG. 8a. However, as the order of the kernel is increased, the channel structure clearly becomes more and more visible, with the order 7 kernel (FIG. 8c) producing realizations that show two channel looking structure at approximately right locations. The bimodal marginal distribution of these realizations as seen in FIG. 8c is also closer to the original binary distribution. With a kernel of order 9 (FIG. 8d), the converged realizations become almost binary, and the two channels are obtained at approximately right locations. The marginal distribution as seen in FIG. 8d is very close to the original binary distribution, but with the mode at 1 somewhat shifted to about 0.9. Another point to note is that for the standard EnKF, permeability of the final ensembles range from below −1 to above +1, while the original range is [0, 1]. With the kernels of order 7 and 9, the ranges are much closer the original range. We also observe that for the standard EnKF, there is some variability among the converged realizations, but as the order of the kernel is increased, the variability reduces, and for the $7^{th}$ and $9^{th}$ order kernels, the all members of the ensemble converge almost to the same permeability field. This is clearly an issue; the reason for this is currently not understood, but will be investigated in the future.

FIGS. 9a-9d shows the oil (91, 93, 95, 97) and water (92, 94, 96, 98) production rates for four of the eight producers for the initial ensemble, and also that of the reference permeability field (black circles (o's) for oil production rate, black crosses (x's) for water production rate). We observe that there is a significant variation in the rates, implying that the initial uncertainty is significant. FIGS. 10-13 illustrates the match to the production data obtained with kernels of order 1, 5, 7 and 9 respectively. FIGS. 10a-10d shows that all the members of the final ensemble almost exactly match the observed production data. However, as the order of the kernel increases (FIGS. 11-13), the match deteriorates, but is still reasonable except for one of the wells for the order 9 kernel (FIG. 13). A possible explanation for the deterioration in match could be that, since this data assimilation problem is a non-unique ill-posed problem, with possibly many solutions, as the order of the kernel is increased, the subspace of the original input space $R^{N_s}$ over which the KEnKF searches for solutions becomes smaller and smaller, and it thus becomes more difficult to find realizations that provide a reasonable degree of match to the observations. In other words, as the order of the kernel is increased, the dimension of the feature space increases, and thus, the same number of realizations (determined by ensemble size) span a smaller subspace of the feature space. Thus, if the true permeability field or similar fields do not lie in this subspace, which could be the case if the initial realizations do not belong to exactly the same random field as the true permeability field, a good match may not be obtained. Therefore, if a good match is not being obtained for a particular order kernel for a given ensemble size, increasing the ensemble size may lead to a better match. This problem, in a way, could actually be considered a benefit, because if a good match is not being obtained with a high order kernel, it could possibly indicate that the prior geological model from which the initial ensemble is drawn may not be correct. In any case, further investigation of this issue is required before a compelling conclusion can be drawn.

However, based on these results, an important conclusion that can be made is that, by controlling the kernel order, a balance between the degree of match to the production data and the geological realism of the final ensemble can be obtained. Further, if the final ensemble obtained with a high order kernel provides an acceptable degree of match; such an ensemble should exude more confidence than another ensemble providing the same degree of match but obtained with a lower order kernel.

Example 2

"Donut" Sand Mode

Figure 15:
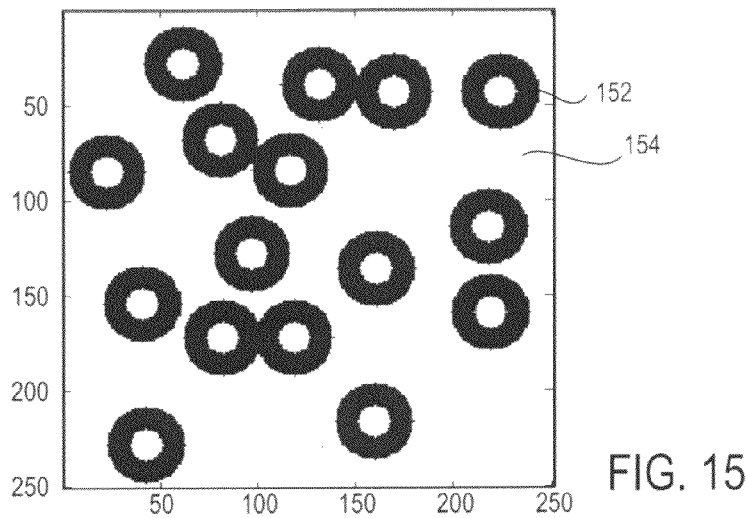
FIG. 15 shows a "Donut" training image used for Example 2
Figure 16A:
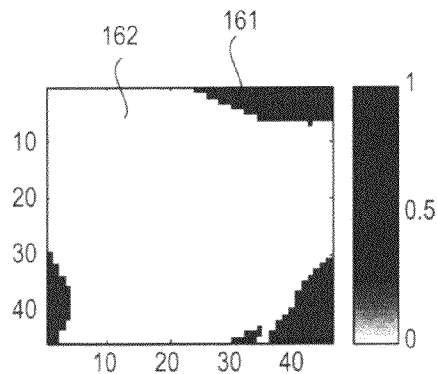
FIGS. 16a-16d show four realizations of another exemplary initial ensemble.
Figure 16B:
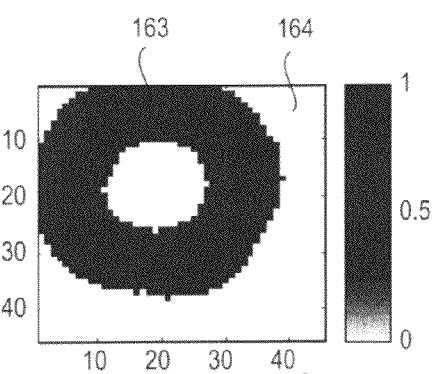
Figure 16C:
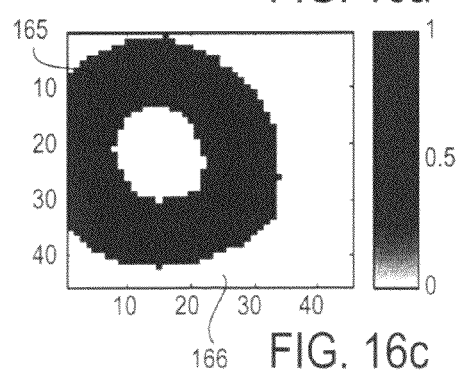
Figure 16D:
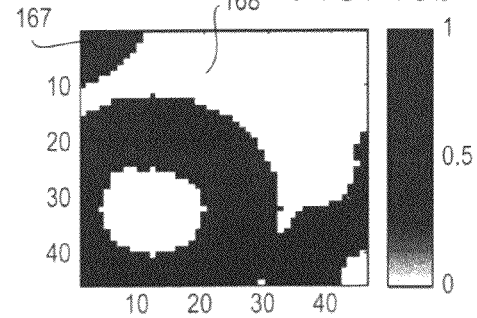
Figure 18A:
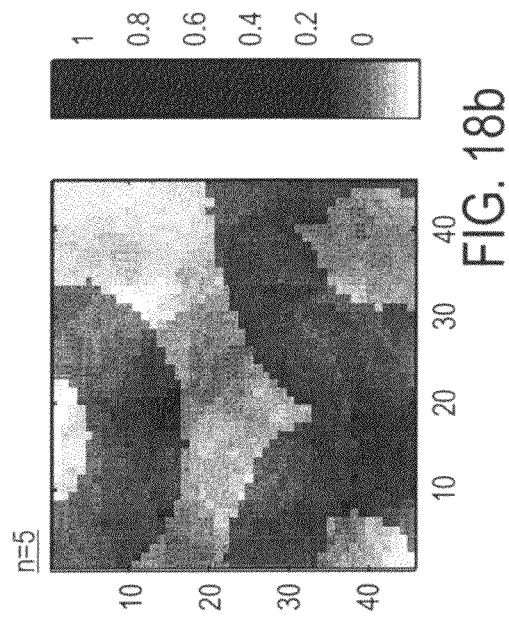
FIGS. 18a-18d show four realizations of a final ensemble (corresponding to the initial ensemble of FIGS. 16a-16d) obtained with the EnKF with order 5 polynomial kernel.
Figure 18B:
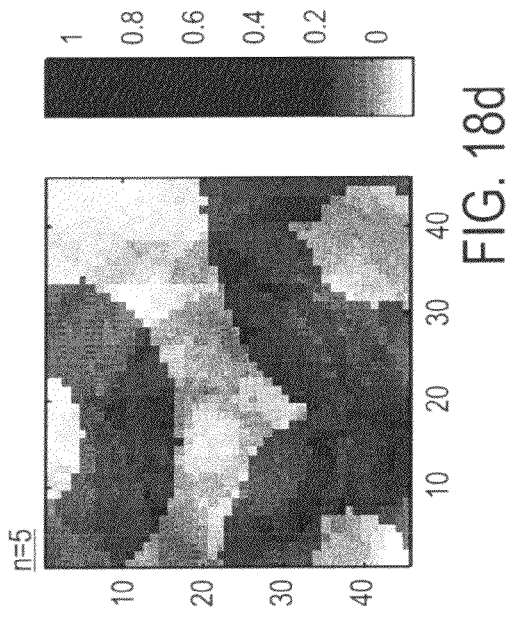
Figure 18C:
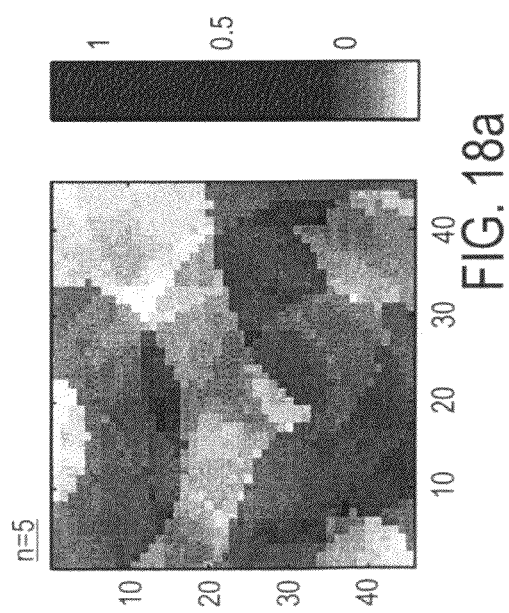
Figure 18D:
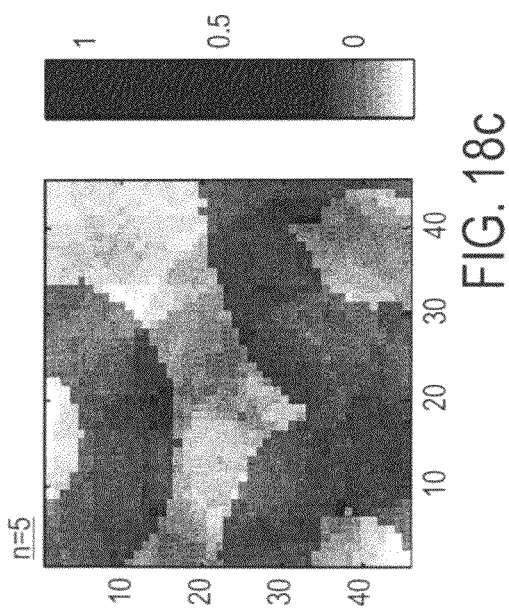

The reservoir model for this example is the same at the last example. The only difference is the reference permeability field, shown in FIG. 14a, which is obtained using the training image shown in FIG. 15 with the geostatistical software filtersim (Zhang, T., *Multiple Point Geostatistics: Filter-based Local Training Pattern Classification for Spatial Pattern Simulation*, PhD Thesis, Stanford University, Stanford, Calif., 2006). The permeability field is characterized by high permeability circular inclusions ("donuts") 142 immersed in a low permeability background (144 regions). The model is run with the true permeability field for 950 days in this case to obtain the observed data. As in the last example, an initial ensemble of 100 permeability fields are obtained using filtersim with the same training image as in FIG. 15, and four of these realizations are shown in FIGS. 16a-16d.

Figure 20B:
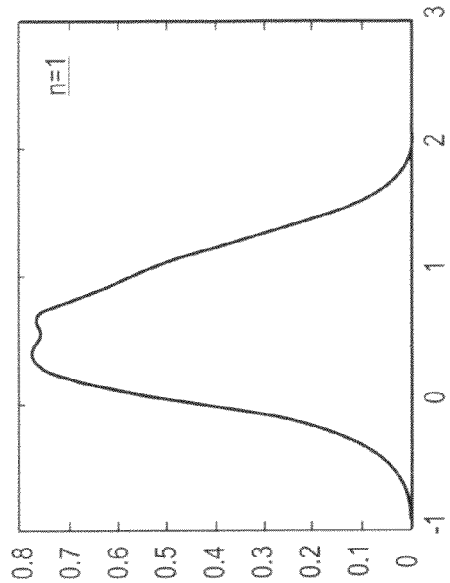
FIG. 20 is a histogram of a true permeability field, and typical marginal distributions of a final ensemble (corresponding to the initial ensemble of FIGS. 16a-16d) obtained with polynomial kernels of order 1 (FIG. 20b), order 5 (FIG. 20c) and order 7 (FIG. 20d)
Figure 20D:
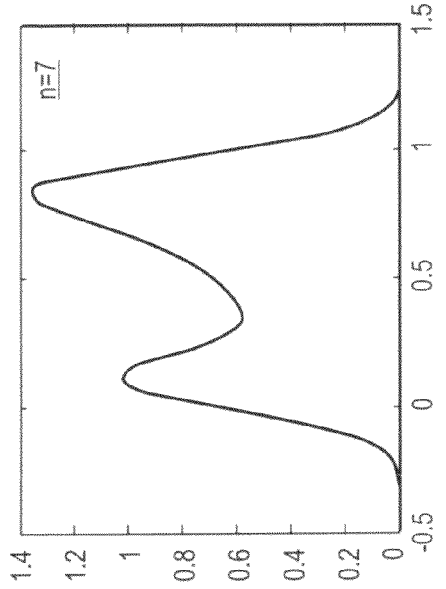
Figure 20A:
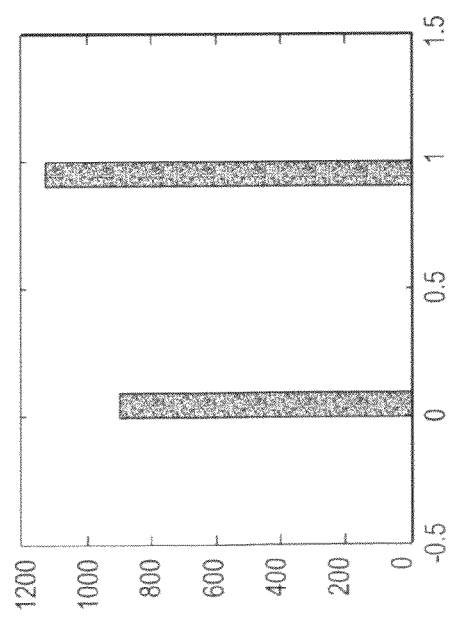
Figure 20C:
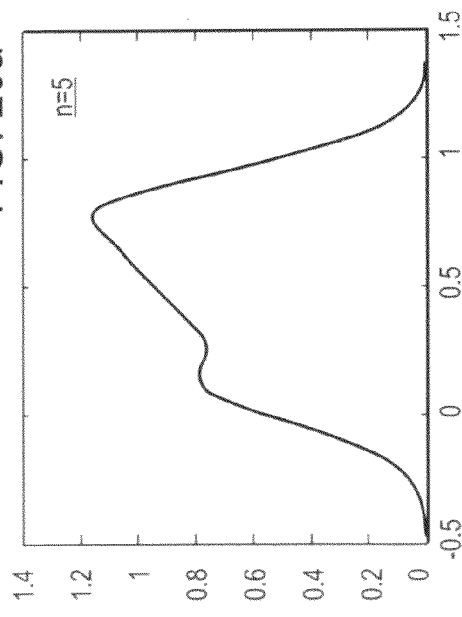
Figure 22B:
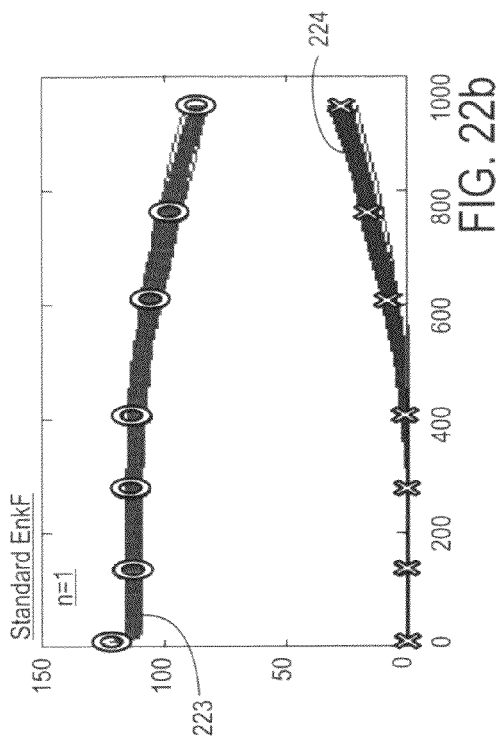
FIGS. 22a-22d show oil (221, 223, 225, 227) and water (222, 224, 226, 228) production rates for four wells for a final ensemble obtained with the standard EnKF, and that of a true permeability field (O's for oil rate, X's for water rate)
Figure 22D:
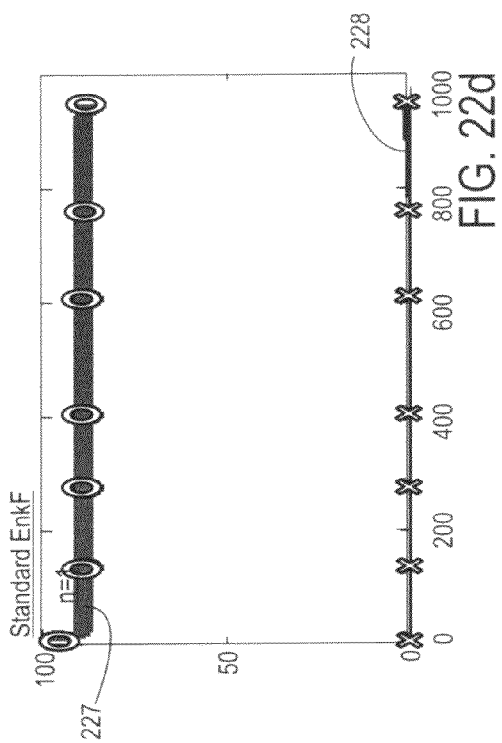
Figure 22A:
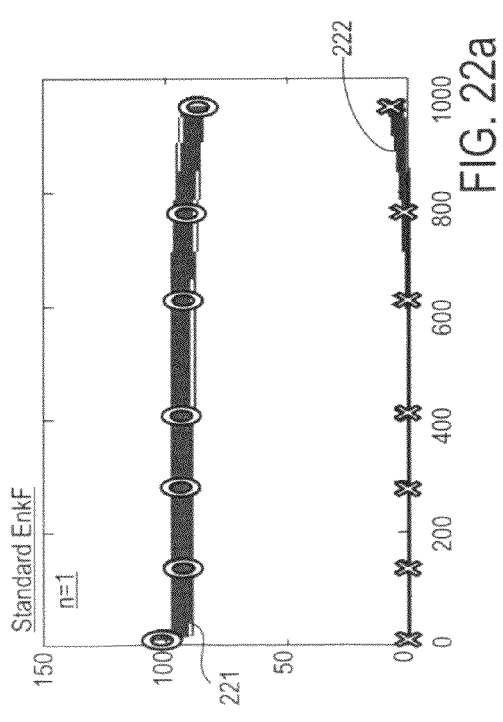
Figure 22C:
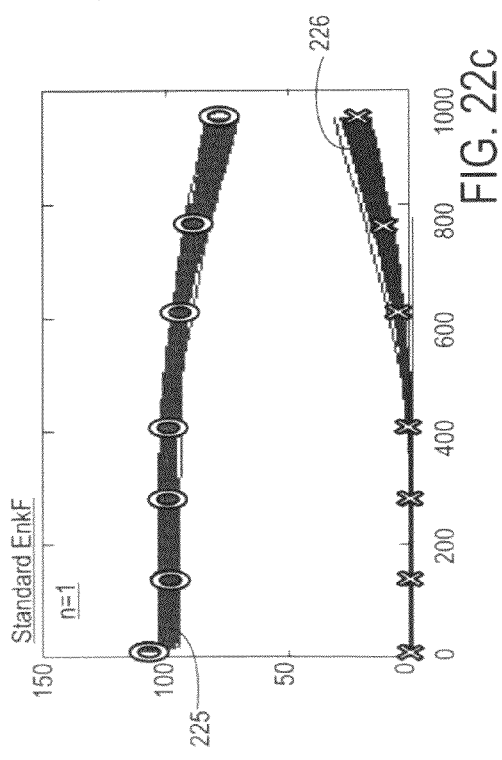
Figure 24A:
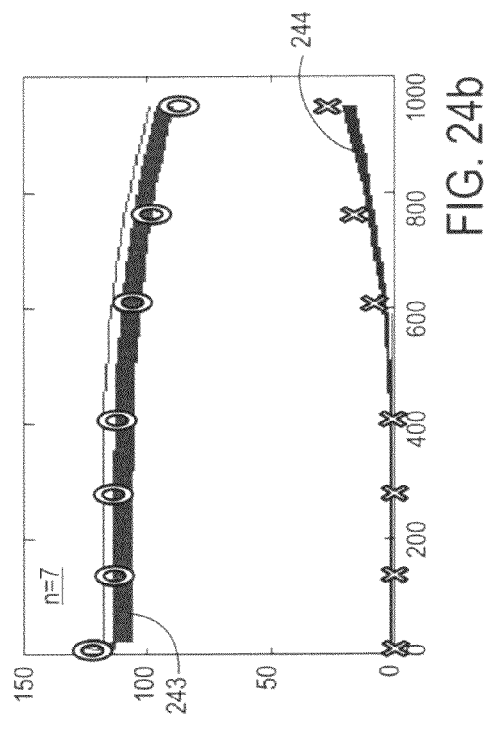
FIGS. 24a-24d show oil (241, 243, 245, 247) and water (242, 244, 246, 248) production rates for four wells for a final ensemble obtained with the EnKF of order 7, and that of a true permeability field (O's for oil rate, X's for water rate)
Figure 24B:
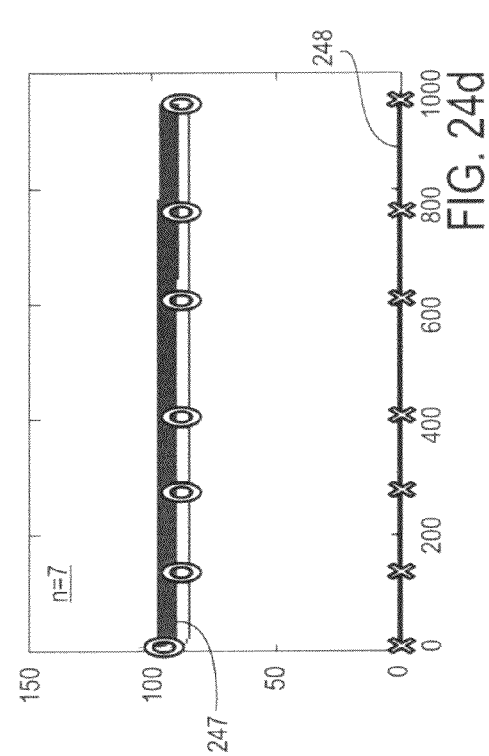
Figure 24C:
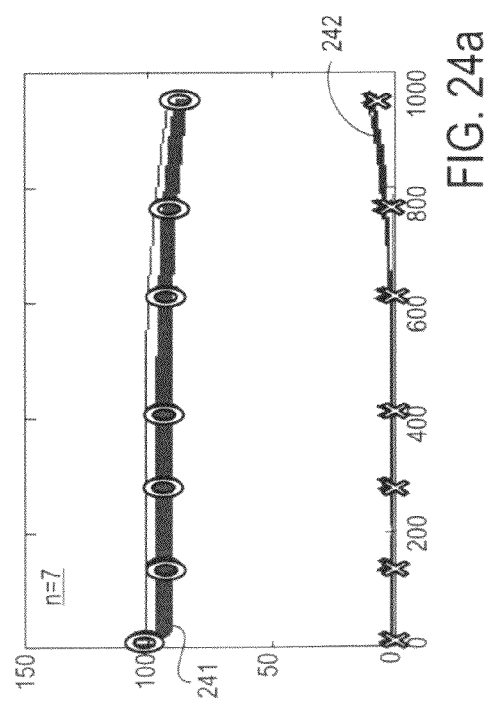
Figure 24D:
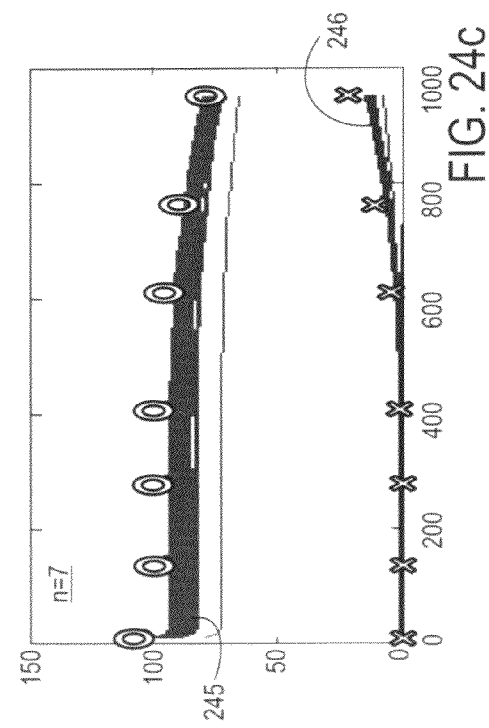

The KEnKF is applied to this ensemble over 5 assimilation steps of 190 days each. FIGS. 17-19 show four updated realizations each of the final ensemble obtained with polynomial kernels of order 1, order 5, and order 7 respectively. As before, we observe that as the kernel order is increased, the donut structure becomes more and more apparent, and in this case, with the $5^{th}$ and $9^{th}$ order kernels, the donut are obtained very clearly at almost the exact locations as in the true realization. FIG. 20a shows the marginal distributions, and we see again that with the standard EnKF, the marginal distribution is Gaussian as expected (FIG. 20b), and with the increase of the kernel order, the marginal distribution becomes a better approximation to the original binary distribution (FIG. 20a).

FIGS. 21a-21d show the oil and water production rates for four of the eight producers for the initial ensemble as in the first example, and also that of the reference permeability field. FIG. 22-24 illustrates the match to the production data obtained with kernels of order 1, 5, and 7 respectively. In contrast to the first example, in this case, all kernels obtain a very good match to the production data. However, clearly the realizations obtained with the $7^{th}$ order kernel (FIG. 19) are much better estimates of the true realization than that obtained with the standard EnKF (FIG. 17). This exemplifies the fact that if reasonable matches are obtained with different order kernels, the ensemble obtained with higher order kernels may provide better estimates of the random field being estimated.

An efficient nonlinear generalization of the EnKF using kernels has been demonstrated, which is capable of representing complex geological models characterized by multi-point geostatistics. By deriving the EnKF in a high-dimensional feature space implicitly defined using kernels, both the Kalman gain and update equations are nonlinearized, thus providing a completely general nonlinear set of EnKF equations, the nonlinearity being controlled by the kernel. By choosing high order polynomial kernels, multi-point statistics and therefore geological realism of the updated random fields can be preserved. If a polynomial kernel of order one is used, the KEnKF reduces to the standard EnKF. The efficiency of the KEnKF is similar to the standard EnKF irrespective of the kernel order.

The applicability of the approach was demonstrated through two synthetic examples, where the permeability field was updated with the KEnKF using polynomial kernels of different orders. Results indicate that as the order of the kernel is increased, key geological features are better retained by the updated ensemble, while providing a reasonable degree of match to the production data. By controlling the kernel order, a balance between the degree of match to the production data and the geological realism of the final ensemble can be obtained. Further, if the final ensemble obtained with a high order kernel provides an acceptable degree of match, such an ensemble is seen to be more geologically realistic than another ensemble providing the same degree of match but obtained with a lower order kernel.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A system for predicting fluid flow in a subterranean reservoir having non-Gaussian characteristics, the system comprising:
   a computer processor configured to execute computer readable program code for accessing an ensemble of initial models representing a subterranean reservoir having non-Gaussian characteristics;
   a data source accessible to the computer processor for collecting reservoir field data for a predetermined duration of time;
   model update program code, executable by the computer processor, for receiving the reservoir field data, and for using the field data with a kernel-based ensemble Kalman filter to update the initial models of the ensemble at a predetermined time such that data from the updated initial models are consistent with the field data and such that the non-Gaussian characteristics of the reservoir in the updated initial models are preserved, thereby maximizing accuracy of reservoir prediction data to be generated by the updated initial models, wherein using the kernel-based ensemble Kalman filter includes using an equation, wherein the equation is:

$$y^{n+1} = \frac{\theta}{1+\theta} y^n + \frac{1}{1+\theta} \frac{\sum_{i=1}^{M} b_{ij} \sum_{k=1}^{q} k(y_i^f \cdot y^n)^{k-1} y_i^f}{\sum_{k=1}^{q} k(y^n \cdot y^n)^{k-1}}$$

-continued $$\forall j = 1, \ldots, M$$

wherein θ is a relaxation factor;
wherein M refers to number of ensemble members of the ensemble of initial models;
wherein y is a state vector;
wherein n is an iteration number;
wherein $y^f$ is a forecasted state vector;
wherein q refers to an order of the kernel; and
wherein b is a coefficient of the kernel-based ensemble Kalman filter.

2. The system of claim 1, wherein the kernel-based ensemble Kalman filter includes a gain function configured for reservoirs having non-Gaussian random field characteristics.

3. The system of claim 1, wherein the kernel-based ensemble Kalman filter includes a gain function configured for reservoirs having non-Gaussian field data characteristics.

4. The system of claim 1, wherein the kernel-based ensemble Kalman filter includes an updated model configured for reservoirs having non-Gaussian random field characteristics.

5. The system of claim 1, wherein the kernel-based ensemble Kalman filter includes an updated model configured for reservoirs having non-Gaussian field data characteristics.

6. The system of claim 1, further comprising image realization means for transforming the prediction data generated by the updated initial models into image data representations of the reservoir.

7. The system of claim 6, further comprising image display means, in communication with the image realization means, for displaying the image data representations of the reservoir.

8. The system of claim 1, wherein the model update program code is executable by the computer processor to use a second equation for reservoirs having non-Gaussian field data characteristics, wherein the second equation is:

$$z_j = B^T(\psi_{d_o,j} - 1\lambda_{d_o,j} - \psi_{d_j} + 1\lambda_{d_j}) \text{ where } \lambda_d = \frac{1}{M}\sum_{i=1}^{M} \psi(d, d_i)$$

wherein M refers to number of ensemble members of the ensemble of initial models;
wherein j equals 1 to M;
wherein d is the non-Gaussian field data;
wherein $B^T$ is a transpose of a coefficient matrix; and
wherein ψ is a kernel matrix.

9. The system of claim 1, wherein using the kernel-based ensemble Kalman filter includes using a high order polynomial kernel.

10. A computer-implemented method for predicting fluid flow in a subterranean reservoir having non-Gaussian characteristics, the method comprising:
accessing, via a computer processor, an ensemble of initial models representing a subterranean reservoir having non-Gaussian characteristics;
collecting reservoir field data for a predetermined duration of time; and
updating the initial models of the ensemble at a predetermined time such that data from the updated initial models are consistent with the field data and such that the non-Gaussian characteristics of the reservoir in the updated initial models are preserved, thereby maximizing accuracy of reservoir prediction data to be generated by the updated initial models, wherein the updating step comprises using the field data and a kernel-based ensemble Kalman filter, wherein using the kernel-based ensemble Kalman filter includes using an equation, wherein the equation is:

$$y^{n+1} = \frac{\theta}{1+\theta}y^n + \frac{1}{1+\theta}\frac{\sum_{i=1}^{M} b_{ij} \sum_{k=1}^{q} k(y_i^f \cdot y^n)^{k-1} y_i^f}{\sum_{k=1}^{q} k(y^n \cdot y^n)^{k-1}}$$

$$\forall j = 1, \ldots, M$$

wherein θ is a relaxation factor;
wherein M refers to number of ensemble members of the ensemble of initial models;
wherein y is a state vector;
wherein n is an iteration number;
wherein $y^f$ is a forecasted state vector;
wherein q refers to an order of the kernel; and
wherein b is a coefficient of the kernel-based ensemble Kalman filter.

11. The computer-implemented method of claim 10, wherein the kernel-based ensemble Kalman filter comprises a gain function adapted for reservoirs having non-Gaussian random field characteristics.

12. The computer-implemented method of claim 10, wherein the kernel-based ensemble Kalman filter comprises a gain function adapted for reservoirs having non-Gaussian field data characteristics.

13. The computer-implemented method of claim 10, wherein the kernel-based ensemble Kalman filter comprises an updated model adapted for reservoirs having non-Gaussian random field characteristics.

14. The computer-implemented method of claim 10, wherein the kernel-based ensemble Kalman filter comprises an updated model adapted for reservoirs having non-Gaussian field data characteristics.

15. The computer-implemented method of claim 10, further comprising transforming the prediction data generated by the updated initial models into image data representations of the reservoir.

16. The computer-implemented method of claim 15, further comprising displaying the image data representations of the reservoir.

17. The computer-implemented method of claim 10, further comprising using a second equation for reservoirs having non-Gaussian field data characteristics, wherein the second equation is:

$$z_j = B^T(\psi_{d_o,j} - 1\lambda_{d_o,j} - \psi_{d_j} + 1\lambda_{d_j}) \text{ where } \lambda_d = \frac{1}{M}\sum_{i=1}^{M} \psi(d, d_i)$$

wherein M refers to number of ensemble members of the ensemble of initial models;
wherein j equals 1 to M;
wherein d is the non-Gaussian field data;
wherein $B^T$ is a transpose of a coefficient matrix; and
wherein ψ is a kernel matrix.

18. The computer-implemented method of claim 10, wherein using the kernel-based ensemble Kalman filter includes using a high order polynomial kernel.

19. An article of manufacture, comprising non-transitory computer usable medium having a computer readable program code embodied therein, the computer readable program code adapted to be executed to implement a method for predicting fluid flow in a subterranean reservoir having non-Gaussian characteristics, the method comprising:

collecting reservoir field data for a predetermined duration of time;

accessing an ensemble of initial models representing a subterranean reservoir having non-Gaussian characteristics;

using a kernel-based ensemble Kalman filter to update the initial models of the ensemble at a predetermined time such that data from the updated initial models are consistent with the field data and such that the non-Gaussian characteristics of the reservoir in the updated initial models are preserved, thereby maximizing accuracy of reservoir prediction data to be generated by the updated initial models, wherein using the kernel-based ensemble Kalman filter includes using an equation, wherein the equation is:

$$y^{n+1} = \frac{\theta}{1+\theta}y^n + \frac{1}{1+\theta}\frac{\sum_{i=1}^{M} b_{ij}\sum_{k=1}^{q} k(y_i^f \cdot y^n)^{k-1} y_i^f}{\sum_{k=1}^{q} k(y^n \cdot y^n)^{k-1}}$$

$$\forall\, j = 1, \ldots, M$$

wherein $\theta$ is a relaxation factor;

wherein M refers to number of ensemble members of the ensemble of initial models;

wherein y is a state vector;

wherein n is an iteration number;

wherein $y^f$ is a forecasted state vector;

wherein q refers to an order of the kernel; and wherein b is a coefficient of the kernel-based ensemble Kalman filter.

20. The article of manufacture of claim 19, wherein the computer readable program code adapted to be executed to implement the method for predicting fluid flow in the subterranean reservoir having non-Gaussian characteristics, the method further comprising using a second equation for reservoirs having non-Gaussian field data characteristics, wherein the second equation is:

$$z_j = B^T(\psi_{d_o,j} - 1\lambda_{d_o,j} - \psi_{d_j} + 1\lambda_{d_j})\text{ where } \lambda_d = \frac{1}{M}\sum_{i=1}^{M}\psi(d, d_i)$$

wherein M refers to number of ensemble members of the ensemble of initial models;

wherein j equals 1 to M;

wherein d is the non-Gaussian field data;

wherein $B^T$ is a transpose of a coefficient matrix; and wherein $\psi$ is a kernel matrix.

\* \* \* \* \*